United States Patent
Shaw

(10) Patent No.: US 10,163,031 B2
(45) Date of Patent: *Dec. 25, 2018

(54) METHOD AND SYSTEM FOR FULL PATH ANALYSIS

(75) Inventor: George Shaw, Palo Alto, CA (US)

(73) Assignee: RETAILNEXT, INC., San Jose, CA (US)

(*) Notice: Subject to any disclaimer, the term of this patent is extended or adjusted under 35 U.S.C. 154(b) by 442 days.

This patent is subject to a terminal disclaimer.

(21) Appl. No.: 13/603,832

(22) Filed: Sep. 5, 2012

(65) Prior Publication Data
US 2013/0222599 A1    Aug. 29, 2013

Related U.S. Application Data

(60) Provisional application No. 61/605,054, filed on Feb. 29, 2012.

(51) Int. Cl.
*G06K 9/60* (2006.01)
*G06K 9/00* (2006.01)

(52) U.S. Cl.
CPC .......... *G06K 9/60* (2013.01); *G06K 9/00771* (2013.01)

(58) Field of Classification Search
CPC ...................................................... H04N 7/181
USPC ........................................ 356/4.01; 348/159
See application file for complete search history.

(56) References Cited

U.S. PATENT DOCUMENTS

| 8,098,888 B1* | 1/2012 | Mummareddy ... G06K 9/00778 382/103 |
| 2012/0169842 A1* | 7/2012 | Chuang ............ G08B 13/19619 348/39 |
| 2014/0313502 A1* | 10/2014 | Steele ..................... E21C 35/00 356/4.01 |

* cited by examiner

*Primary Examiner* — Jefferey F Harold
*Assistant Examiner* — Sihar A Karwan
(74) *Attorney, Agent, or Firm* — Dergosits & Noah LLP; Todd A. Noah

(57) ABSTRACT

A space is modeled using images from a set of cameras in the space. An easy to use tool is provided that allows users to identify a reference location in an image and a corresponding reference location on a floor plan of the space. Based on these correspondences, a model is generated that can map a point in a camera's view to a point on the floor plan, or vice-versa. Subjects moving through the space are identified and tracked using the model and attributes associated with a subject. In a specific implementation, the attributes include velocity, color, size, and position. In a specific implementation, the space is a retail store and the subjects are customers browsing through the retail store.

9 Claims, 27 Drawing Sheets

2605 →

Survey a space to make a floor plan of the space
2610

Install a set of cameras in the space
2615

Adjust cameras to have overlapping views
2620

Provide the floor plan to the system
2625

For each camera, use a graphical user interface tool to place a set of calibration points in a camera view and a set of corresponding calibration points on the floor plan to generate a model of the space
2630

Figure 26

METHOD AND SYSTEM FOR FULL PATH ANALYSIS

CROSS-REFERENCE TO RELATED APPLICATIONS

This patent application claims priority to U.S. provisional patent application 61/605,054, filed Feb. 29, 2012, and is incorporated by reference along with all other references cited in this application.

BACKGROUND

The present invention relates to the field of information technology, including, more particularly, to systems and techniques for tracking subjects.

Tracking subjects through a real world space offers benefits in a variety of areas including commercial, business, corporate, security, government, science, and others. For example, brick and mortar businesses have long desired to gather data that would allow them to better understand customer behavior. Such data can be used to make decisions about merchandising, advertising, pricing, staffing, design new in-store concepts, and, in particular, understand how customers interact with store displays, make correlations with sales data, calculate conversion rates, identify good locations for merchandise, identify poor performing products and locations, improve store layout, provide targeted promotions, and much more. Providing traditional retailers with a data-driven approach can help them provide the best possible shopping experience, stay ahead of constantly evolving customer needs, reduce cost and significantly increase revenue per square foot.

Existing systems for tracking people in a retail store are cumbersome to configure, difficult to use, and expensive to deploy. For example, such systems may require specially made cameras, precise camera placement, and trained technicians for setup.

Thus, there is a need to provide improved systems and techniques for tracking people through a retail space.

BRIEF SUMMARY OF THE INVENTION

A space is modeled using images from a set of cameras in the space. An easy to use tool is provided that allows users to identify a reference location in an image and a corresponding reference location on a floor plan of the space. Based on these correspondences, a model is generated that can map a point in a camera's view to a point on the floor plan, or vice-versa. Subjects moving through the space are identified and tracked using the model and attributes associated with a subject. In a specific implementation, the attributes include velocity, color, size, and position. In a specific implementation, the space is a retail store and the subjects are customers browsing through the retail store.

In a specific implementation, the system, given the output of person tracking algorithms running on video streams from two or more cameras, provides locations of people over time in "real" space and links those locations across cameras, giving a cohesive record of a single person's location as they move from camera to camera. In this specific implementation, the process includes a first step and a second step. In the first step, the system projects track data from each camera into a single unified coordinate space (e.g., "real space"). In a second step, the system matches and joins tracks belonging to a single tracked subject.

In this specific implementation, the system provides a procedure designed to be undertaken by non-technical users. This is desirable for widespread deployment of the system. A software tool is provided that displays the view from a particular camera side-by-side with a floor plan of the space that the camera sits in. The camera view represents "camera space" with coordinates measured in pixels. The floor plan view represents "real space" with coordinates measured in, for example, centimeters. The tool allows the user to plot corresponding points such that a point in camera space is also located in real space. These points are commonly placed at easily identified landmarks such as the corners of walls and fixtures. All points are assumed to be on the floor, meaning projection proceeds in two dimensions rather than three.

Given these point-to-point correspondences from camera space to real space, the system computers two-way transformation equations to map any point in the camera's view onto the floor plan and any point on the floor plan into the camera's view. Several transformation types are available: projective, and 3rd-degree polynomial. The transformation type chose may be a function of both the number of corresponding points specified and input from the user based on a visualization of the transformation results. With a projective, the lines are generally straight (e.g., straight lines of perspective), but not necessarily parallel. The polynomial allows for curved lines.

A 3rd-degree (or third-order) polynomial has been found to be sufficiently flexible to account for variables such as camera lenses having wide-angle lenses, ultra wide-angle lenses (e.g., fisheye lens), normal lenses, long-focus lenses (e.g., telephoto lenses). The 3rd-degree polynomial allows for modeling of the complex relationship between points in camera space to points in real space. Generally, the higher the order the more flexibility you have, but more points may be required. Having to place more points can increase the time to setup the model of the space. Depending upon factors such as the application and specific camera lenses, however, an implementation can have other order polynomials including, for example, polynomials higher than 3rd-degree (e.g., fourth-order).

The transformation may be derived by computing a least-squares fit to a linear system that describes the relationship between the two coordinate systems as specified by the set of point correspondences. It can be difficult to compute this fit directly, therefore a divide-and-conquer singular value decomposition ("SVD") algorithm may be used.

In a specific implementation, within the view of each camera, subjects are tracked using various vision algorithms. The output of running these algorithms on a video stream are coordinates (in camera space) representing the locations of people in each frame of video. Additionally, the algorithms store shape (e.g., width and height), and color information for each tracked person.

With the projections derived above for each camera together with the output of person tracking from that camera, the system proceeds to project each individual track into real space. In doing so, the system places the location of the tracked subject onto the floor plan for each frame of video; the system uses a modified projection to project the subject's shape into real space (specified in centimeters, for example, rather than pixels).

In this specific implementation, matching then proceeds using a greedy algorithm as follows: for each base track, the system generates a score for all other available candidate tracks. This score describes the likelihood that the base track and the candidate track represent the same subject. The score takes into account temporal and spatial proximity (e.g., does one track end as the other begins?, are they nearby in real space?) as well as shape and color similarity (e.g., does the subject of each track have a similar appearance?).

The base track is joined to all candidate tracks whose score is above a user-specified threshold. These joined tracks are then compared to each other iteratively until no more joins are possible.

In a specific implementation, installed is a system of cameras having overlapping views at their boundaries. Each camera is connected to a server where person tracking proceeds. Track data is stored to a database in real time as video arrives at the server from the camera. The system, however, is designed to work well with limited or no overlap, and has been tested in cases where the distance between adjacent cameras is quite large. Accuracy suffers in these cases as a function of the distance between the edges of the camera view, since the algorithm is estimating the velocity of a tracked subject while they are out of the view of any camera.

Upon installation of the cameras, a user (e.g., installer) performs the calibration where projections are derived based on the method described above. These projections are stored. In a specific implementation, in a batch fashion, track matching is performed. Generally, the track matching is performed once per day at a time when no new video is entering the system. The batch technique helps to conserve computing resources because track matching is not performed in real time. Depending on the application, in other specific implementations, track matching is performed in real time or near real time. The matched tracks, which may be referred to as "full paths," are stored for later analysis.

In a specific implementation, a method includes displaying on an electronic screen a floor plan of a space. While the floor plan is being displayed, displaying on the electronic screen an image including at least portion of the space, the image having been captured by a camera in the space, detecting on the floor plan user placement of a first set of calibration points, detecting on the image user placement of a second set of calibration points, where the second set of calibration points placed on the image are to correspond to locations on the floor plan identified by the first set of calibration points, generating a model based on the placement of the first and second set of calibration points, and providing an indication of an ability of the model to map a point in the image captured by the camera to a location on the floor plan.

In another specific implementation, a method includes storing a base track of a subject captured by a first camera in a space, storing a first candidate track of a first candidate subject captured by a second camera in the space, storing a second candidate track of a second candidate subject captured by the second camera, applying a model including camera-space to real-space mapping data to project the base, first, and second candidate tracks onto a floor plan of the space, analyzing a set of attributes associated with the subject, and first and second candidate subjects to determine whether the first or second candidate subject is the same as the subject, and based on the analysis, joining one of the projected first or second candidate tracks to the projected base track.

In another specific implementation, a method includes providing a floor plan of a space including a first camera that provides a first image, specifying a set of first control points on one of the floor plan or first image to generate a model of the space, specifying a set of second control points on another of the floor plan or first image to generate the model, where the set of second control points are to correspond to the set of first control points, and after the specifying a set of first and second control points, reviewing a distribution of a set of coverage markers shown on at least one of the first image or floor plan to determine an ability of the model to map a point in the first image to a point on the floor plan.

In another specific implementation, a method includes providing a floor plan of a space including a first camera that provides a first view of the space and a second camera that provides a second view of the space, adjusting the first camera so that the first view is partially overlapping with the second view, placing, using a graphical user interface tool, a set of first control points on one of the first view or the floor plan, and a set of first corresponding control points on another of the first view or the floor plan to generate a first model, and reviewing a distribution of coverage markers shown on at least one of the first view or floor plan to determine an ability of the first model to map a point in the first view to a point on the floor plan.

Other objects, features, and advantages of the present invention will become apparent upon consideration of the following detailed description and the accompanying drawings, in which like reference designations represent like features throughout the figures.

BRIEF DESCRIPTION OF THE FIGURES

FIG. 26 shows an overall flow for installing a subject tracking system.

DETAILED DESCRIPTION

Figure 1:
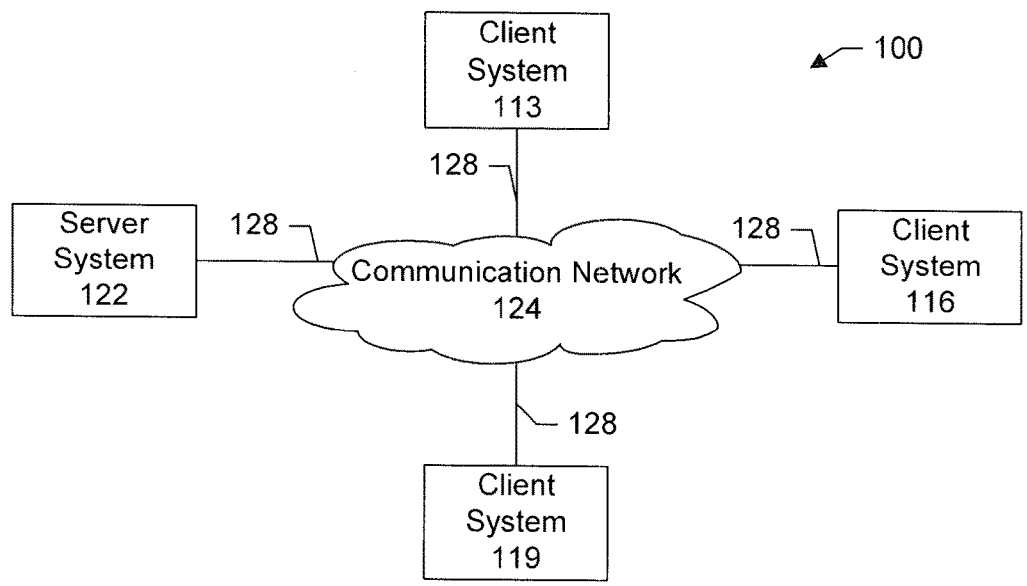
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
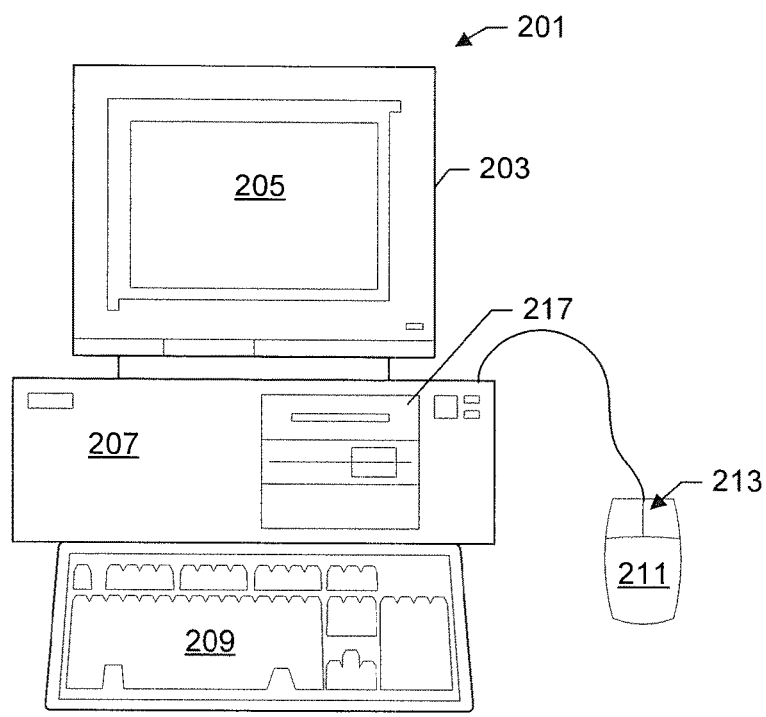
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3A:
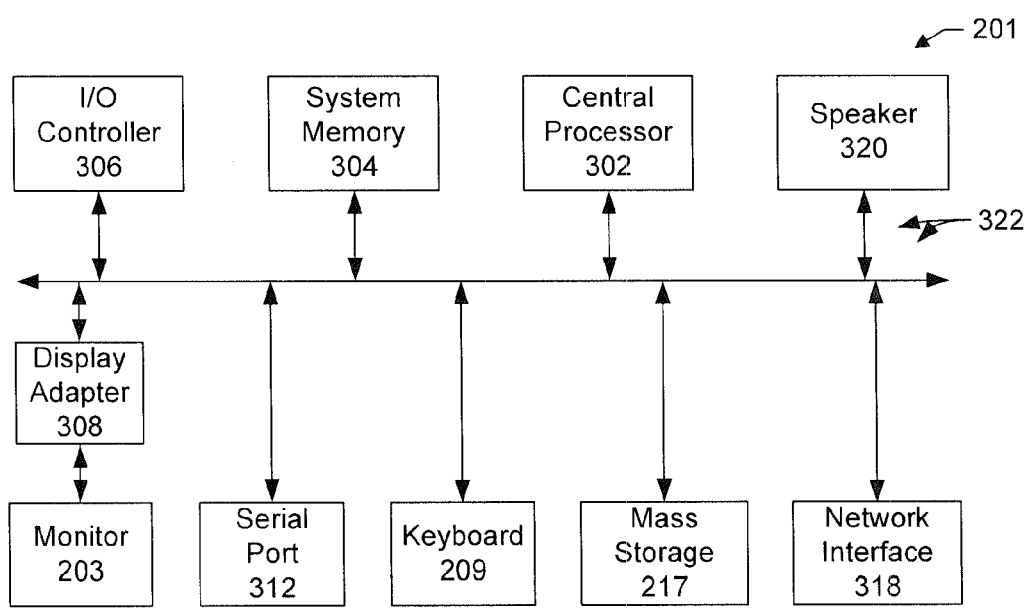
FIG. 3A shows a system block diagram of a client computer system.

FIG. 3A shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 3B:
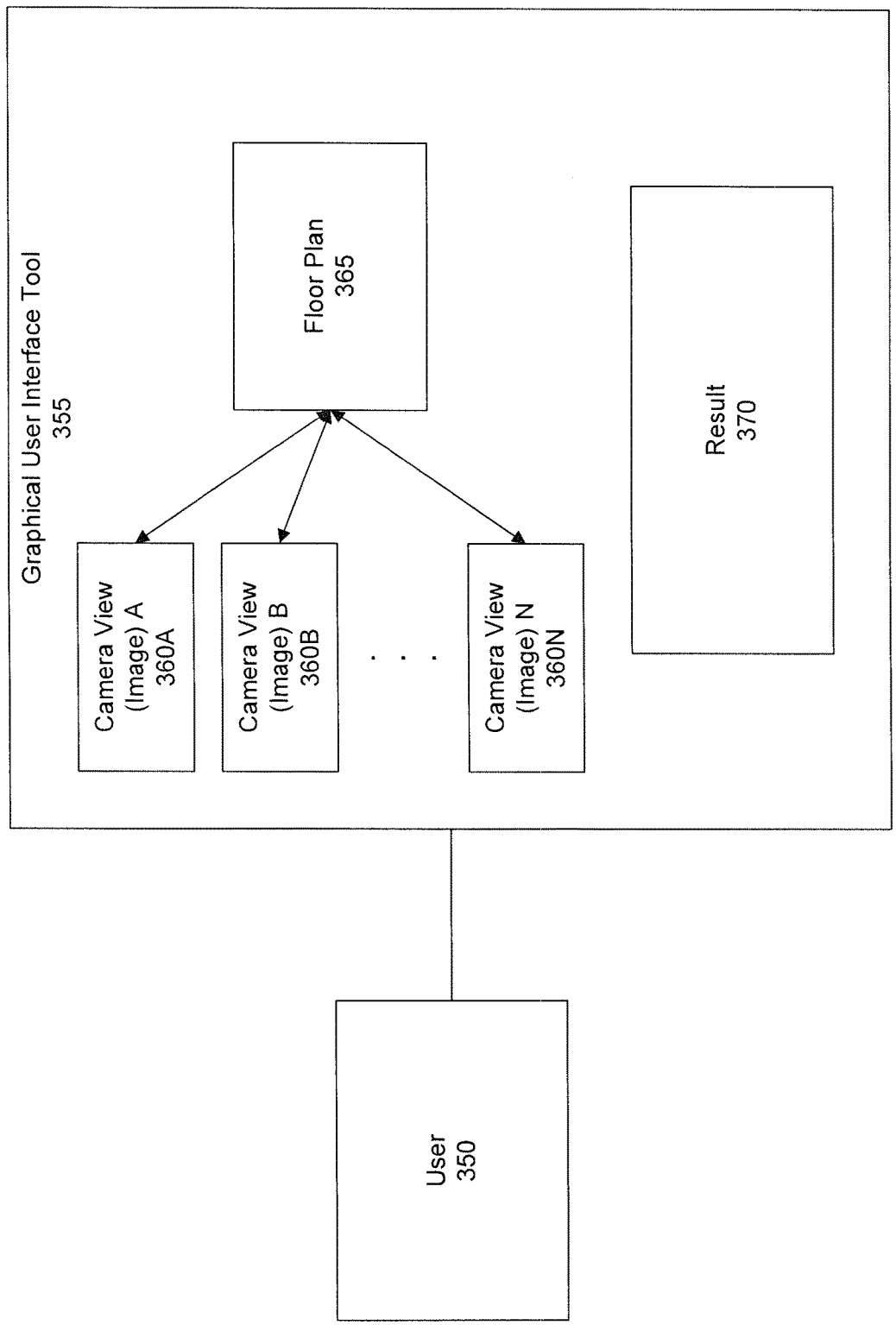
FIG. 3B shows a simplified block diagram of a tool for configuring a subject-tracking system.

FIG. 3B shows a simplified block diagram of a system for creating a model of a space for tracking subjects. There is a user 350 and a graphical user interface tool 355. The tool shows views or images 360A-360N from various cameras in the space and a floor plan 365 of the space.

In an implementation, the user uses the tool to place calibration or control points on one of the floor plan or a camera view and corresponding calibration or control points on another of the floor plan or the camera view. The system uses these point-to-point correspondences to generate a model for the view. The tool displays a result 370. The result provides the user with an indication of an ability or capability of the model to properly map a point in the camera view or image to a location on the floor plan.

If the user, upon reviewing the result, sees that there may be a problem with the model, the user can use the tool to adjust the placement of the points, add new points, remove points, or combinations of these. The system then generates or updates the model and the tool shows an updated result. Once the user is satisfied with the model, the model can be used to track subjects through the space. The tool is designed so that non-technical users can quickly and easily setup and configure a subject tracking system.

Figure 4:
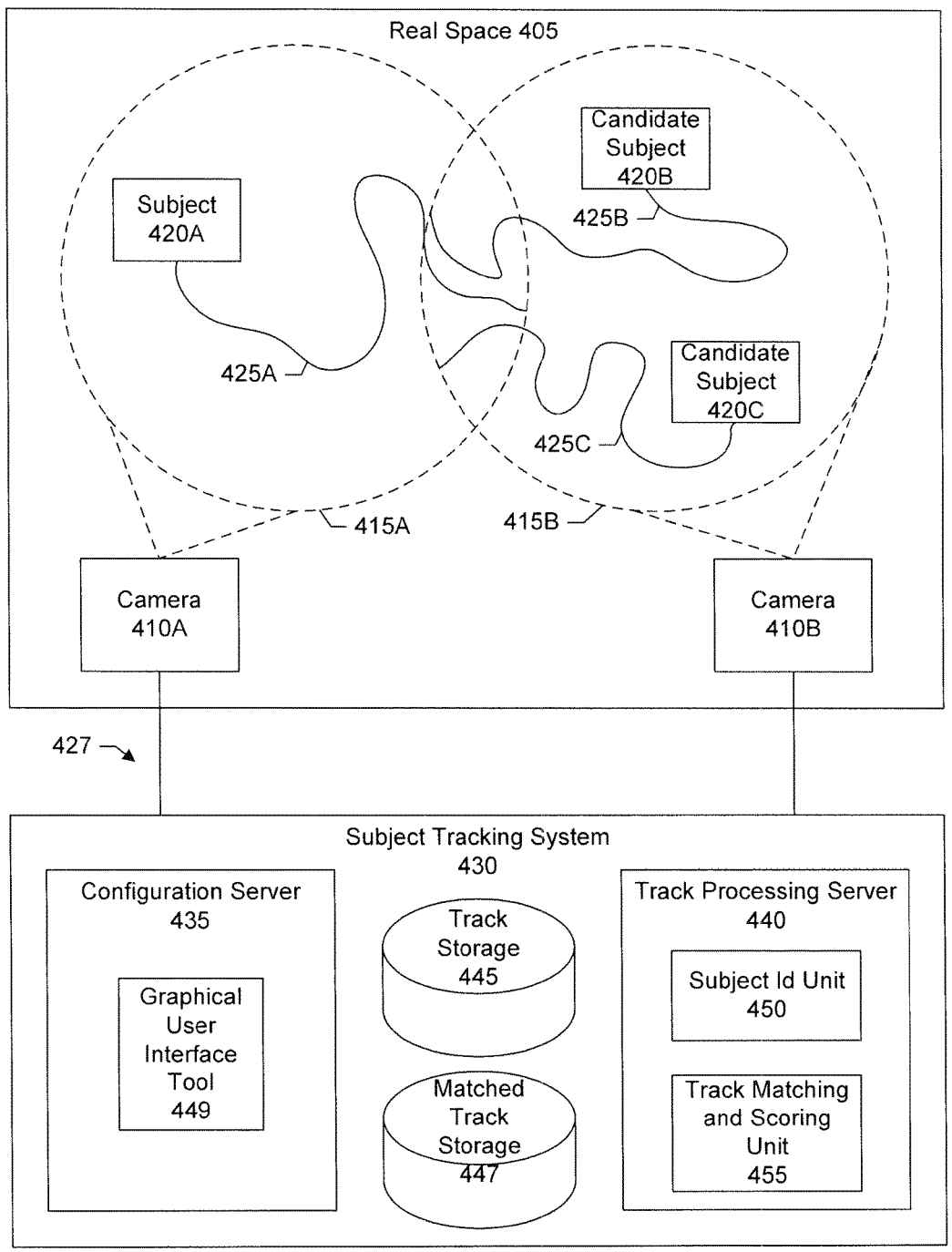
FIG. 4 shows a simplified block diagram of an environment incorporating a system for tracking subjects through a real world space.

FIG. 4 shows a simplified block diagram of an environment incorporating a system for tracking subjects through a real world physical space 405. As shown in FIG. 4, the real space 405 may include first and second cameras 410A and 410B. The first camera captures a first view 415A of a portion of the real space. The second camera captures a second view 415B of another portion of the real space. Within the real space there can be a set of subjects including a first subject 420A, a second subject 420B, and a third subject 420C. A first path 425A represents a path of the first subject moving through the real space. A second path 425B represents a path of the second subject moving through the real space. A third path 425C represents a path of the third subject moving through the real space.

The number of cameras and subjects shown in FIG. 4 is merely for purposes of example and explanation. An environment, such as a retail store, can have any number of cameras such as tens or even hundreds or more cameras. There can be a single camera. Further, at any given time the environment may have no subjects, a single subject, or multiple subjects (e.g., tens or even hundreds or more subjects).

In an embodiment, the cameras are connected through communication links 427 or a communication network to a system 430 that collects and analyzes the video feeds captured by the cameras. The system includes a configuration server 435, a track processing server 440, and storage including a database 445 for storing tracks, and a database 447 for storing matched tracks.

The communication links or network is as shown in FIG. 1 and described above. The servers include components similar to the components shown in FIG. 3A and described above. For example, a server may include a processor, memory, applications, and storage.

In a specific embodiment, the real space is a retail space (e.g., "brick and mortar" business) and the subjects are people or human beings (e.g., customers or shoppers) walking and browsing through the retail space. The retail space may be a grocery store, supermarket, clothing store, jewelry store, department store, discount store, warehouse store, variety store, mom-and-pop, specialty store, general store, convenience store, hardware store, pet store, toy store, or mall—just to name a few examples.

A specific implementation of the system is referred to as RetailNext from RetailNext, Inc. of San Jose, Calif. This system provides a comprehensive in-store analytics platform that pulls together the full set of information for retailers to make intelligent business decisions about their retail locations and visualizes it in a variety of automatic, intuitive views to help retailers find those key lessons to improve the stores. The system provides the ability to connect traffic, dwell times, and other shopper behaviors to actual sales at the register. Users can view heat maps of visitor traffic, measure traffic over time in the stores or areas of the stores, and connect visitors and sales to specific outside events. The system can provide micro-level conversion information for areas like departments, aisles, and specific displays, to make directly actionable in-store measurement and analysis.

The cameras can be any type of camera capable of motion picture acquisition. The real time images captured by the camera may be recorded to a storage device for processing. The camera may feed real time images directly to a screen for immediate observation. The camera may be part of a closed-circuit television ("CCTV") system and may include features such as pan, tilt, and zoom ("PTZ") for security, surveillance, and monitoring purposes.

Some examples of the different type of cameras that may be used with the system include bullet cameras, dome cameras, covert cameras, outdoor cameras, day/night cameras, varifocal cameras, network/IP cameras, wireless cameras, PTZ cameras, speed domes, high-definition cameras, infrared cameras, and many others. Depending upon the type of application, the camera lens may be a fisheye lens, normal lens, a fixed focal-manual iris, fixed iris-manual focus, varifocal, a motorized zoom lens, or a pinhole lens. For example, auto iris lenses are designed for outdoor use, or applications with variable lighting conditions. Fixed lenses provide fixed focal lengths from super wide angle to telephoto depending on the camera format and intended application. Varifocal lenses are designed to meet a variety of applications, providing the flexibility to adjust between different focal lengths with a single lens. The size of a fixed lens may range from about 2.8 millimeters ("mm") to about 16 mm. The larger the size of the lens, the more narrow and zoomed in the field of view is. A 3.6 mm fixed lens can provide about a 72 degree field of view. A 6 mm fixed lens can provide about a 43 degree field of view. A 12 mm fixed lens can provide about a 22 degree field of view. A 16 mm fixed lens can provide about a 19 degree field of view.

A feature of the system includes an ability to generate a model of a space for subject tracking using any type of existing camera system that may be in place. This helps to lower installation costs because new system-specific cameras do not have to be installed. The system can be used in cases where two or more cameras are from different manufacturers, have different camera lenses, have different camera lens sizes, have different camera viewing angles, are of different types, are of different makes, are of different models, or combinations of these. Further, it is not necessary that the camera be mounted directly overhead the space that is to be monitored. For example, a camera may be mounted at on the ceiling at an angle or on a wall. A new camera can be installed in the space. The new camera can be configured without having to reconfigure the other existing cameras.

The configuration server is responsible for receiving user input to create a mathematical model or homography of the space. The model allows the mapping of a point in the camera's view onto the floor plan and vice-versa, i.e., the mapping of a point on the floor plan into the camera's view. The configuration server includes a graphical user interface tool 449 that a user uses during the setup process to generate a model of the space captured by the cameras. The tool may be referred to as a calibration tool, setup tool, or camera-view to floor plan mapping tool. The tool allows a model of the space to be created without having to place physical calibration markers in the real space. The tool is designed to be easy to use so that non-technical users can quickly setup the system. In various specific implementations, the tool can be accessed over a network at a client computer. For example, the tool may be accessed from within a Web browser application program. The tool may be installed as an application program on the client computer.

Database 445 stores tracking information for the subjects which represent the subjects' movements through the various camera views. For example, the database may store track 425A representing first subject 420A moving through first camera view 415A, track 425B representing second subject 420B moving through second camera view 415B, and track 425C representing third subject 420C moving through second camera view 415B.

The track processing server includes a subject identification unit 450 and a track scoring and matching unit 455. The subject identification unit is responsible for identifying the tracked subject. In a specific implementation, the subjects are identified using a set of attributes that may be associated with a subject track. The set of attributes may be stored at the server as a profile of the subject.

The track scoring and matching unit is responsible for analyzing the tracks stored in database 445 and joining or matching the tracks such that a joined track represents a single subject as the subject moves through the real space from one camera to another camera. The joined tracks are stored in matched tracks database 450.

Figure 5:
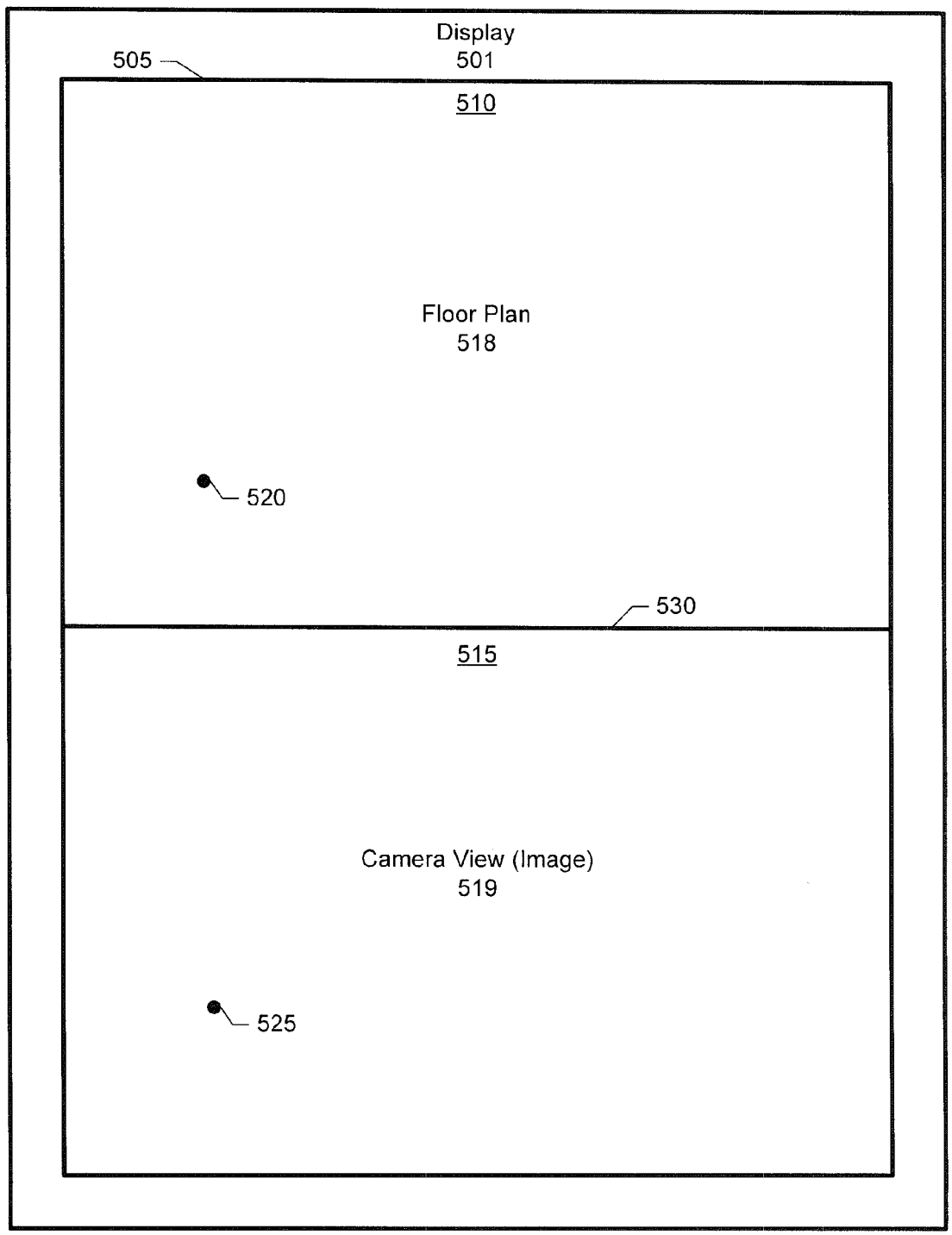
FIG. 5 shows an example of an interface of the tool having a floor plan of a space and an image capturing a portion of the space in a side-by-side vertical layout.

FIG. 5 shows a specific implementation of a graphical user interface (GUI) of the tool as shown on a computer display or screen 501. The interface includes an application window 505 provided by the tool for modeling a physical space. This application window includes a first section 510 and a second section 515. The first section shows a floor plan 518 of a real space. The second section shows an image 519 from a camera in the real space that captures at least a portion of the real space.

A floor plan is a diagram of a floor of a store, building, or room. Typically, a floor plan is drawn to scale. A floor plan can show real objects with accurate sizes that have been reduced by a certain amount (i.e., scale). For example, a floor plan having a scale of 1:10 would indicate that anything drawn with a size of "1" would have a size of "10" in the real world. The floor plan coordinates may be based on a global or world coordinate system. Examples of systems of measurements for the floor plan include the metric system (e.g., millimeters or centimeters), or US customary units (e.g., inches or feet). The floor plan may be obtained by making a survey or measurement of the real space and inputting or uploading the measurements to the system.

Figure 8:
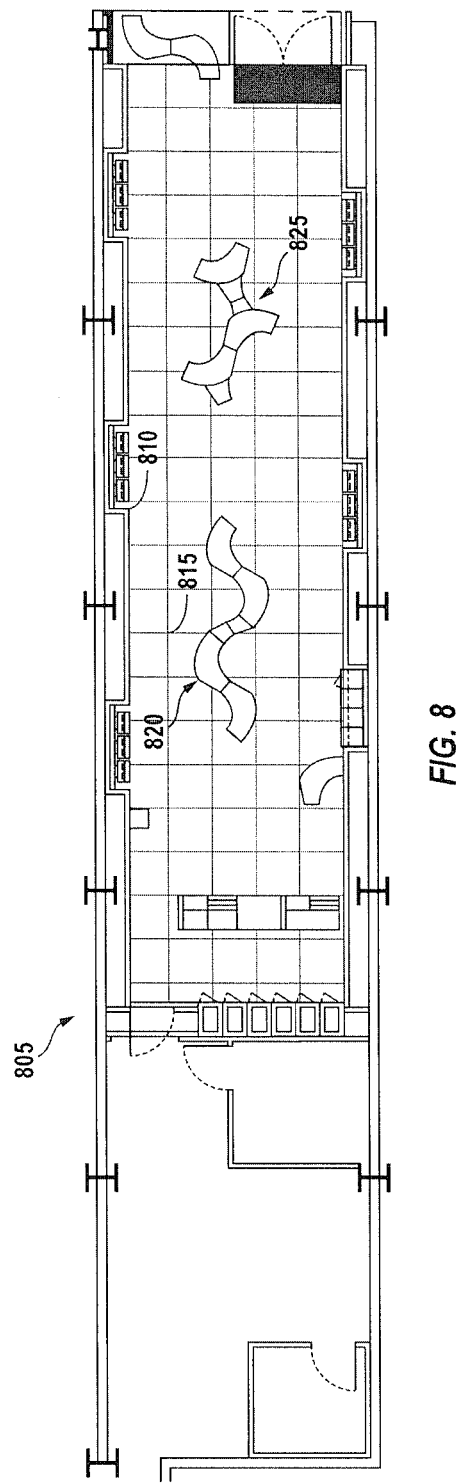
FIG. 8 shows an example of a floor plan.

FIG. 8 shows an example of a floor plan 805 that may be shown within the first section of the application window. The floor plan includes various architectural features such as a corner 810 of a floor, a corner 815 of a tile, and so forth. This example of the floor plan further includes a display case such as display cases 820 and 825.

Referring now to FIG. 5, the image may be a still or video image of at least a portion of the real space. The image is captured by a camera within the real space. For example, the camera may be mounted to a ceiling or wall in the real space.

Figure 9:
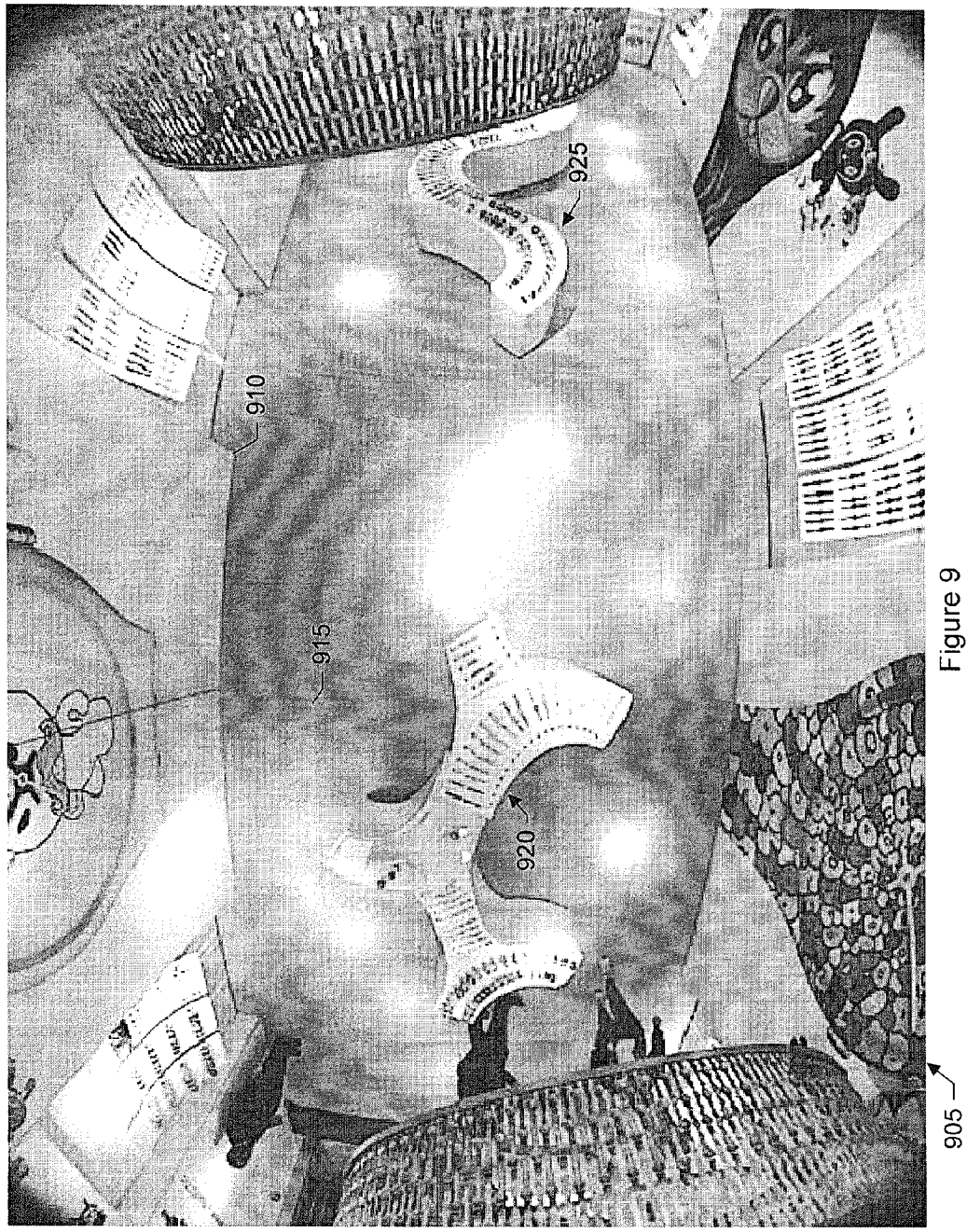
FIG. 9 shows an example of a view or image from a camera.

FIG. 9 shows an example of an image 905 that may be shown within the second section of the application window. This image is from a camera having a fisheye lens. The fisheye lens is an ultra wide-angle lens that produces strong visual distortion intended to create a wide panoramic or hemispherical image. Fisheye lenses achieve wide angles of view by forgoing producing images with straight lines of perspective (rectilinear images), opting instead for a special mapping (e.g., equisolid angle), which gives images a characteristic convex non-rectilinear appearance.

Image 905 shows a corner 910 of the floor, a corner 915 of the tile, a display case 920, and a display case 925. Corner 910 corresponds to (or is the same as) corner 810 on the floor plan (FIG. 8). Compare FIG. 8 with FIG. 9. Image 905 shows some features found on floor plan 805 as shown in FIG. 8. For example, corner 915 corresponds to corner 815 on the floor plan. Display case 920 corresponds to display case 820 on the floor plan. Display case 925 corresponds to display case 825 on the floor plan.

Referring now to FIG. 5, a user uses the tool to place, select, specify, or identify a point on the floor plan and a corresponding point on the image, or vice-versa, i.e., to place a point on the image and a corresponding point on the floor plan. The system uses these point-to-point identifications of correspondences to generate a model of the space.

More particularly, in a specific implementation, a user uses a pointing device such as mouse or other input device to place a first calibration or control point 520 over a first reference location shown on the floor plan. For example, the user can hover the mouse cursor over the first reference location and then click the mouse button to drop the first calibration or control point. In this specific implementation, after placing the first calibration point, the user places a second calibration or control point 525 on the image. The second calibration or control point is intended to correspond to the first calibration point. That is, the second calibration point is to be placed over a second reference location on the image where the first and second reference locations are to be at the same or at about the same location. Based on the placement of these calibration or control points, the system generates a model of the space captured by the camera. The system computes two-way transformation equations to map any point in the camera's view onto the floor plan and any point on the floor plan into the camera's view.

Figure 6:
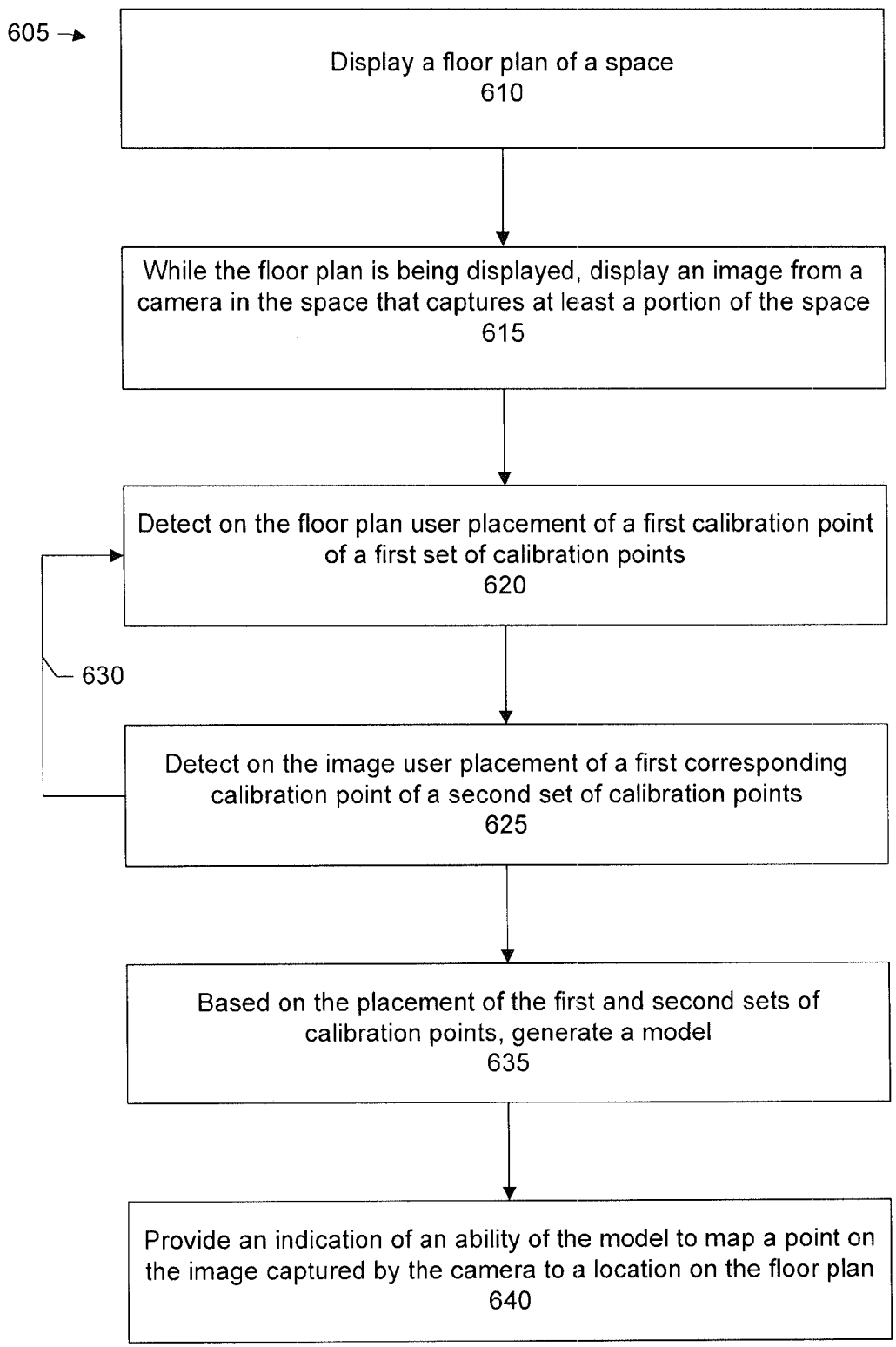
FIG. 6 shows a flow diagram for using the tool.

FIG. 6 shows an overall flow 605 for using the tool. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 610, the tool displays a floor plan of a space. In a step 615, while the floor plan is being displayed, the tool displays an image from a camera in the space that captures at least a portion of the space. In a specific implementation, the floor plan and the image are displayed on the screen concurrently or simultaneously. That is, during or while the displaying the floor plan of the space on the screen, the system displays the image capturing at least a portion of the space. Displaying the floor plan and image simultaneously helps the user to identifying a point on, for example, the floor plan, and a corresponding point on the image where both the point and corresponding point identify the same location. The user can remain focused on a single application window and not lose context. The user does not have to switch to different tools in order to identify the point-to-point correspondences.

In a step 620, the tool detects on the floor plan user placement or input of a first calibration point of a first set of calibration points. In a specific implementation, the system prompts the user to select or identify a reference location on the floor plan and to place the first calibration point at the reference location. The system may provide the user with some instructions or guidance on how to select the reference locations. For example, the system may advise the user to select a reference location that is on the floor or ground plane, select at least four reference locations, select at least ten reference locations, select a random or scattered distribution of reference locations (e.g., ensure that the selected reference locations do not lie on a single line or are collinear), or combinations of these. The instructions may be provided as a "Help" menu item of the tool, on a printed (e.g., paper) user manual, a video (e.g., online video tutorial), or combinations of these.

Locations can be any feature that is readily and precisely locatable in both views (e.g., floor plan view and image view). Examples include corners of the floor, architectural features such as columns, and edges of doorways. A reference location can be a stationary object. A reference location can be a non-stationary object as long as the non-stationary object can be located in the image and floor plan. For example, the image may include a movable display case. As long as the display case is represented on the floor plan and is in the same or about the same location as shown on the image, the display case can be selected as a reference location. Allowing non-stationary objects to be selected as reference locations helps with the usability of the system because in some cases architectural features such as columns, and other features on the floor may be obscured such as by a display case.

Generally, the number of reference locations needed for generating the model is dependent on factors such as the camera lens rather than the square footage of the space. To an extent, the greater the number of reference locations, the more precise the generated model. However, too many reference locations can result in "over modeling" the space. In a specific implementation, the number of reference locations selected for a camera ranges from about 4 to about 25 reference locations. This includes, for example, 5, 6, 7, 8, 9, 10, 11, 12, 13, 14, 15, 16, 17, 18, 19, 20, 21, 22, 23, 24, or more than 25 reference locations.

In a step 625, the tool detects on the image user placement of a first corresponding calibration point of a second set of calibration points. In a specific implementation, after placement of the first calibration point on the floor plan has been detected the system prompts the user to select a corresponding reference location on the image and to place the first corresponding calibration point at the corresponding reference location.

As shown by a loop 630, steps 620 and 625 may be repeated multiple times. In a specific implementation, the steps are repeated at least four times so that at least four calibration points have been placed on the floor plan and a matching number of corresponding calibration points have been placed on the image.

Figure 10:
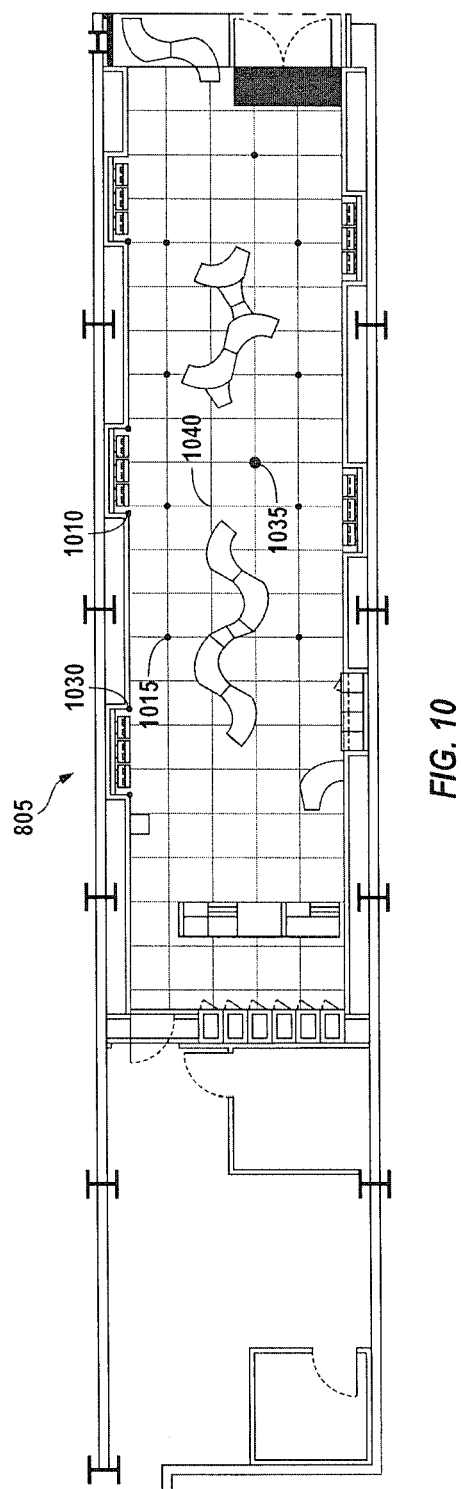
FIG. 10 shows an example of calibration or control points placed on the floor plan using the tool.
Figure 11:
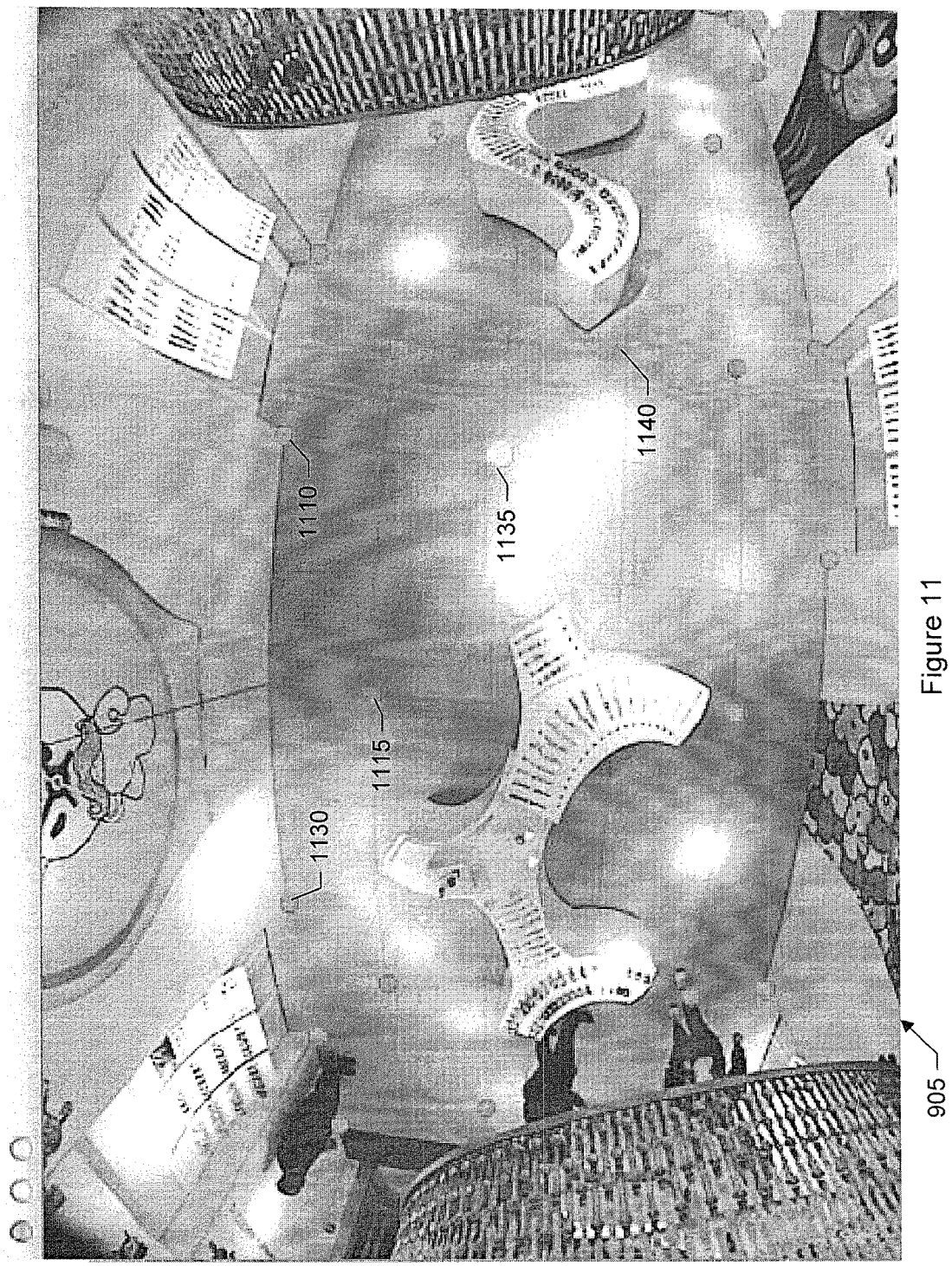
FIG. 11 shows an example of corresponding calibration or control points placed on the camera view or image using the tool.

FIGS. 10 and 11 show the calibration (or control) points and corresponding points identifying the reference locations being placed on floor plan 805 and image 905. As shown in FIG. 10, the user has used the tool to place a calibration point 1010 that identifies a reference location on the floor plan. In FIG. 11, the user has used the tool to place a corresponding calibration point 1110 on the image that identifies the same reference location as shown on the floor plan in FIG. 10 (see steps 620-630, FIG. 6).

The user repeats the process of placing points and corresponding points several times for camera each in the space. For example, FIG. 10 further shows the placement of calibration points 1015, 1030, and 1035. FIG. 11 shows the placement of calibration points 1115, 1130, and 1135. Calibration point 1015 (FIG. 10) on the floor plan is intended to correspond to (e.g., identify the same location) as calibration point 1115 (FIG. 11) on the image. Calibration point 1030 is intended correspond to calibration point 1130. Calibration point 1035 is intended to correspond to calibration point 1135.

In an implementation, the user can select a point placed on one of the image or floor plan, and the tool highlights a corresponding point that has been placed on another of the image or floor plan. This helps the user check their placement of a point pair to ensure that the point and corresponding point of the pair are identifying the same locations.

For example, upon selecting one of points 1035 (FIG. 10) or 1135 (FIG. 11), the tool highlights another of points 1035 or 1135. In this example, points 1035 and 1135 identify different reference locations. This could result in generating an inaccurate model. The reference location identified by point 1035 on the floor plan is at a location 1140 on the image. The reference location identified by point 1135 on the image is at a different location 1040 on the floor plan. The user should adjust the points so that the points identify the same reference locations. For example, the user can use the tool to move (e.g., drag and drop) point 1035 (FIG. 10) to location 1040 on the floor plan. Alternatively, the user can move point 1135 (FIG. 11) to location 1140 on the image.

Any technique or combinations of techniques may be used to highlight a selected point and its corresponding point. For example, the pair of points may be shown in a color that is different from a color of the other point pairs, in a size (e.g., area) that is different from a size of the other point pairs, or both. In a specific implementation, the pair of points is colored red and the other point pairs are colored green. In this specific implementation, the pair of points is shown in a diameter that is greater than a diameter of the other point pairs. Other highlighting techniques that may be implemented include animation (e.g., blinking or flashing), different shapes (e.g., dot or circle, triangle, square, rectangle, star, or diamond), different patterns (e.g., solid fill pattern, no fill pattern, vertical line pattern, horizontal line pattern), text (e.g., bubble pops up next to the corresponding point having the words "corresponding point"), or arrows—just to name a few examples.

Referring now to FIG. 6, in a step 635, based on the placement of the first and second sets of calibration or control points, the system generates a model of the space. In an implementation, after the user has established the calibration points for a camera, the user clicks a button or other graphical control provided by the tool to generate the model. In a step 640, upon receiving the input, the tool provides an indication of an ability of the model to map a point on the image captured by the camera to a location on the floor plan. In a specific implementation, the system provides the indication by displaying on the floor plan, image, or both a set of coverage markers.

Figure 12:
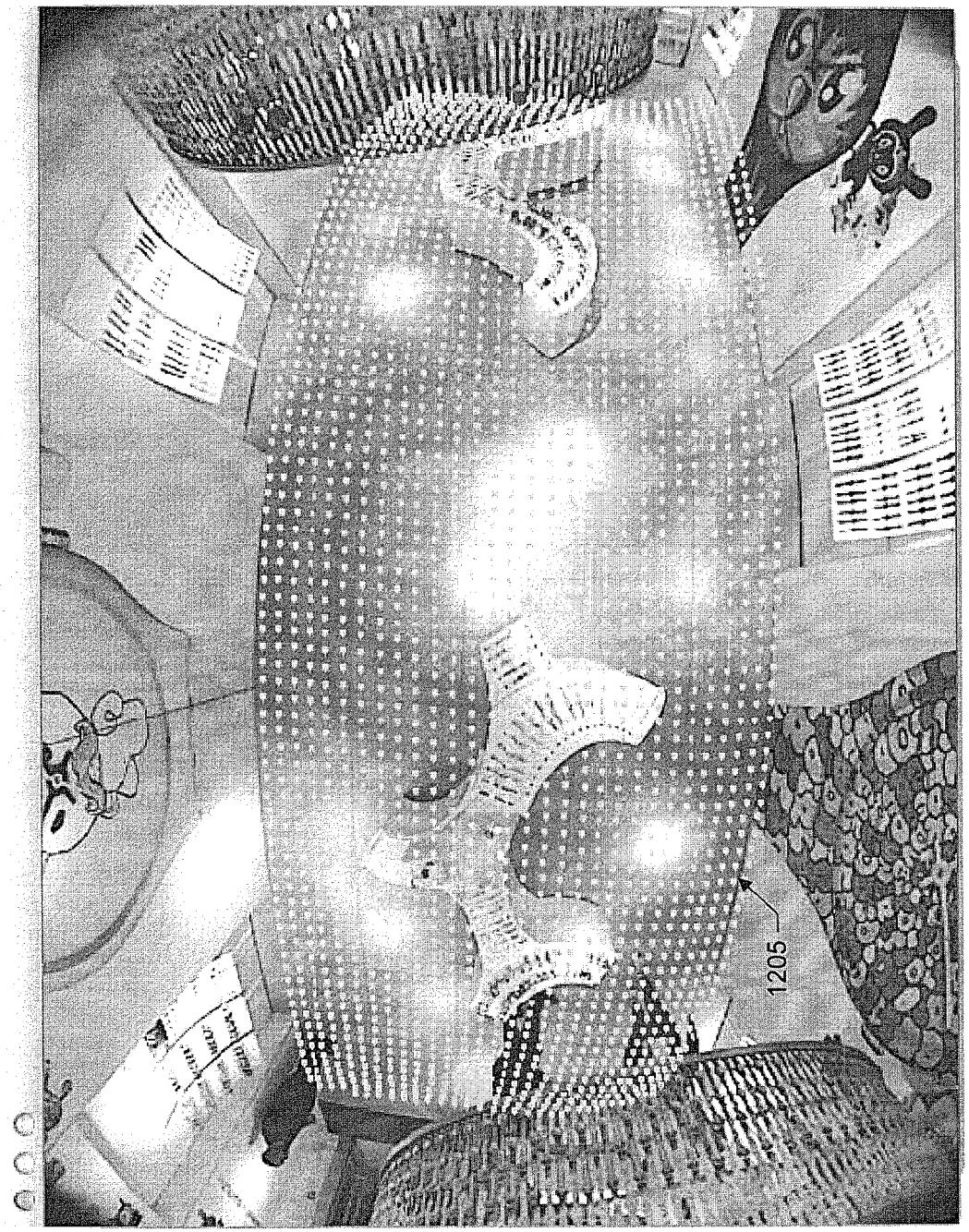
FIG. 12 shows an example of a good distribution of coverage markers on the camera image.
Figure 13:
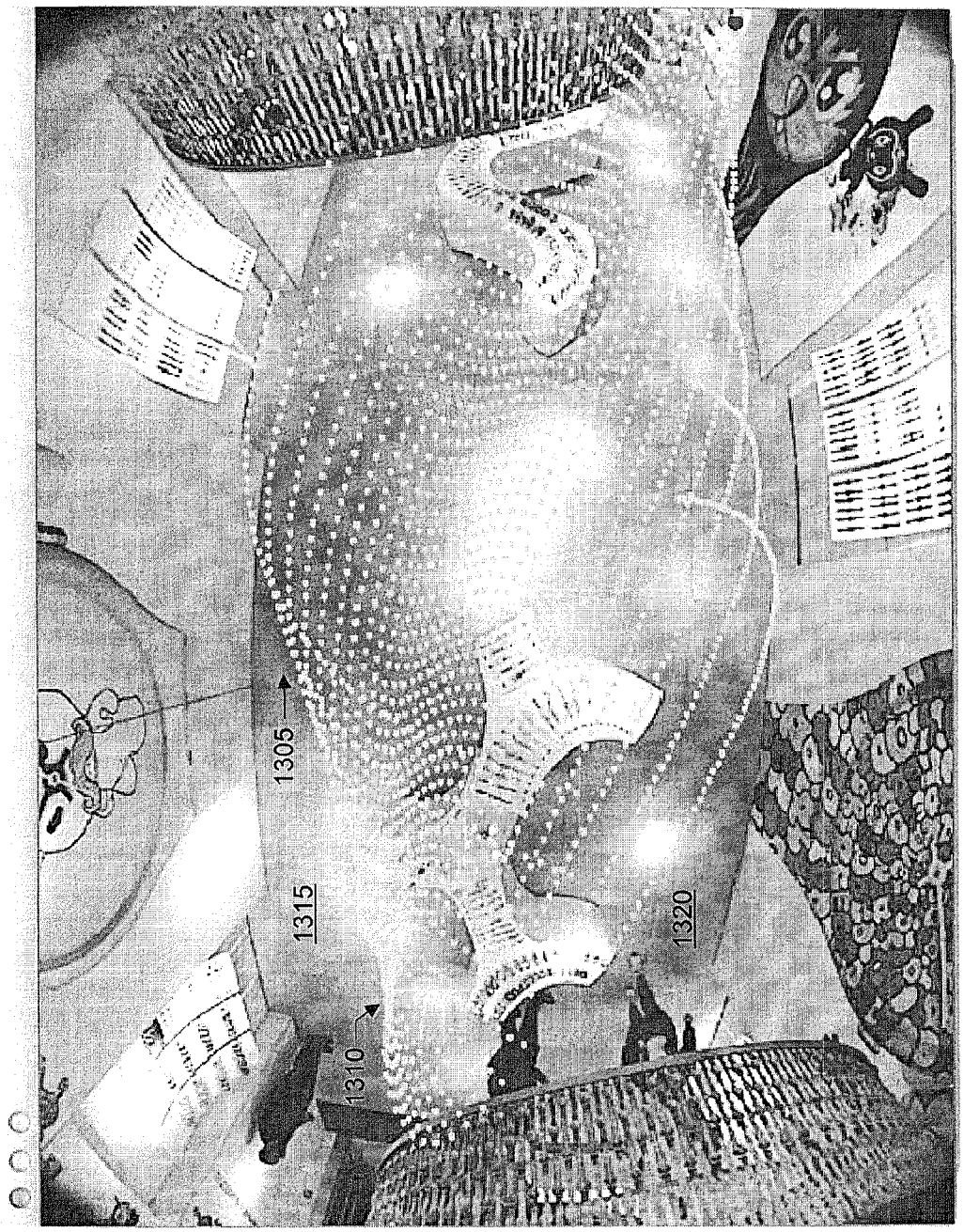
FIG. 13 shows an example of a poor distribution of coverage markers on the camera image.

FIGS. 12 and 13 show the coverage markers being displayed on the image. FIG. 12 shows an example of a good distribution of coverage markers 1205. This distribution indicates that the generated model will be able to accurately map a point on the image to its proper location on the floor plan. FIG. 13 shows an example of a poor distribution of coverage markers 1305. This distribution indicates that the generated model will not be able to accurately map the point on the image to its location on the floor plan.

Compare the distribution of coverage markers shown in FIGS. 12 and 13. The distribution in FIG. 12 is different from the distribution in FIG. 13. In FIG. 13, the distribution includes a twist or swirl 1310 as if the coverage markers are folding over themselves. There are several large portions (e.g., portions 1315 and 1320) that are missing or are without coverage markers. The coverage markers appear distorted and do not follow a grid.

In contrast, in FIG. 12 the distribution does not have the twist shown in FIG. 13. The coverage markers do not appear to be folding over themselves. Further, there are no large portions of image that are missing coverage markers. Rather, the coverage markers are spread out across the floor.

Figure 14:
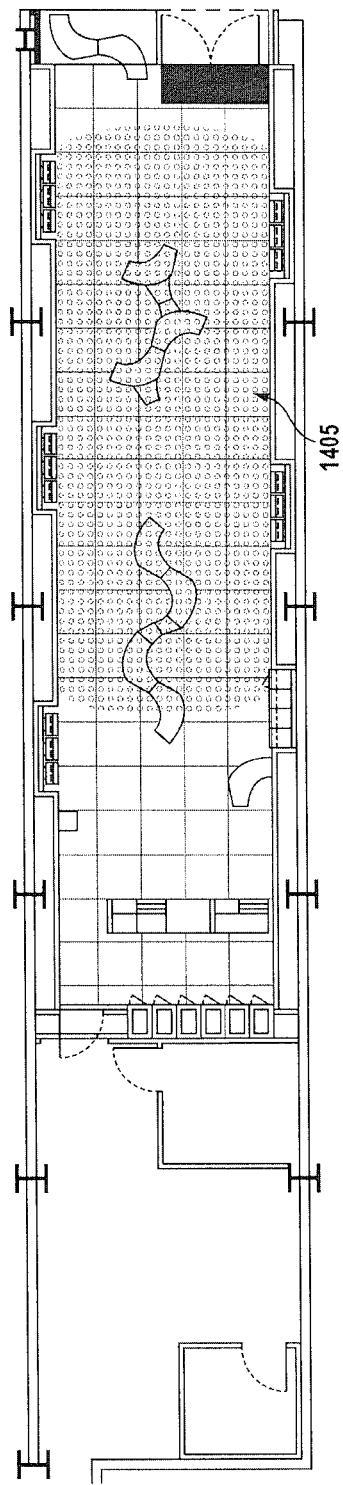
FIG. 14 shows an example of a good distribution of coverage markers on the floor plan.

The distribution has a convex non-rectilinear appearance as would be expected when viewing an even or uniform distribution grid of coverage markers through a camera having a fisheye lens. For example, FIG. 14 shows a top undistorted view of a good distribution of coverage markers 1405 over an area of the floor plan captured by the view of the camera. When distribution 1405 is viewed through the fisheye camera lens in this example, one would expect the appearance to be as shown in FIG. 12.

In an implementation, the user reviews, evaluates, or assesses the distribution using a holistic approach. The user may imagine that each coverage marker is locatable in both views (i.e., each coverage marker is treated as a calibration point). The user can then determine if the locations of all markers in one view correspond correctly to the locations in the other view. This imagined correspondence happens from the floor plan view (where locations are in a straightforward grid) to the camera view (where locations may become twisted, skewed, or otherwise distorted when the model fit is poor).

The user can review the distribution of coverage markers shown on the screen to determine whether or not the model will be able to properly map a point in the camera image to a location on the floor plan. If the distribution includes characteristics similar to that shown in FIG. 12, the user can conclude that the model is able to properly perform the mapping. If the distribution includes characteristics similar to that shown in FIG. 13, the user can conclude that the model will not be able to properly perform the mapping. This real time or near-real time visual feedback of the model makes it easy for the user to know whether they can move forward with the model or whether adjustments should be made. The user does not have to interpret a complex set of equations or output. Rather, with the tool, the user can simply place sets of points and corresponding points, press a button, and view the graphical results.

If the result is a distribution similar to that shown in FIG. 13, the user can use the tool to make adjustments. The system generates a new model and shows a new distribution of coverage markers that indicate an ability of the new model to map points between the image and floor plan. The user can review the new distribution. If the new distribution is not satisfactory, the user can quickly make more adjustments and iterate. Adjustments may include, for example, moving a point on the image, moving a point on the floor plan, adding a point on the image, adding a point on the floor plan, removing or deleting a point on the image, removing a point on the floor plan, or combinations of these.

For example, upon reviewing the result and seeing a distribution having a twist (e.g., FIG. 13), the user can go back and check the placement of the points and corresponding points. As discussed above, the user may discover that point 1035 (FIG. 10) and corresponding point 1135 (FIG. 11) identify different locations. The user can use the tool to move one or both points (e.g., adjust or move their on-screen positions) so that they identify the same or about the same locations. The user may, for example, move a point on one of the image or floor plan to the left, right, up, down, or diagonally across the screen so that it matches the location identified by the corresponding point on another of the image or floor plan. Instead or additionally, the user may add an additional point to one of the image or floor plan and add an additional corresponding point to another of the image or floor plan.

The system is designed to tolerate some imprecision in the placement of the points. The tolerance may range from about 1 centimeter to about 10 centimeters, including less than 1 centimeter or more than 10 centimeters. Thus, the user does not have to be exact about the placement of a point on one of the image or floor plan and the placement of a corresponding point on another of the image or floor plan.

In the examples shown in FIGS. 12 and 13, the coverage markers have the shape of a circle or dot. It should be appreciated, however, that a coverage marker can have any shape such as a square, rectangle, triangle, diamond, and so forth. The coverage markers may as appear as a grid or mesh superimposed over the floor plan, image, or both. The coverage markers shown in FIGS. 12 and 13 are examples of a graphical visual indication. In other implementations, the indication may instead or additionally include text (e.g., "Model is good," or "Model may not be accurate"), audio (e.g., beeps), and so forth.

In an implementation, a user performs the calibration or setup flow shown in FIG. 6 for each camera in the space. In an implementation, the system generates per-camera models in real time (i.e., the model is updated after every new point is placed or after a point is moved or edited). These model updates happen transparently to the user, so that the coverage markers can be displayed at any time.

Figure 15:
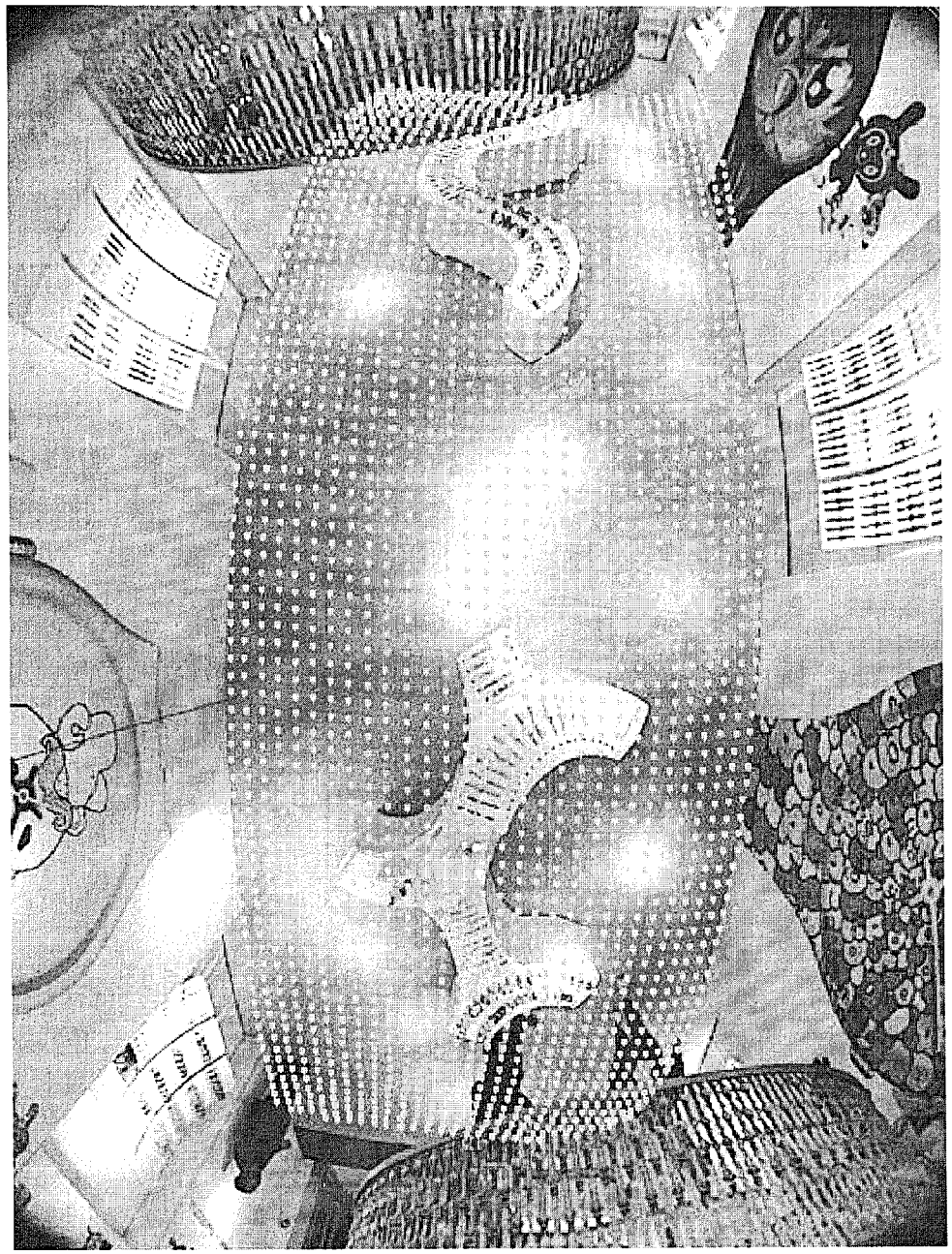
FIG. 15 shows an example of coverage markers on a camera image resulting from a polynomial transform.
Figure 16:
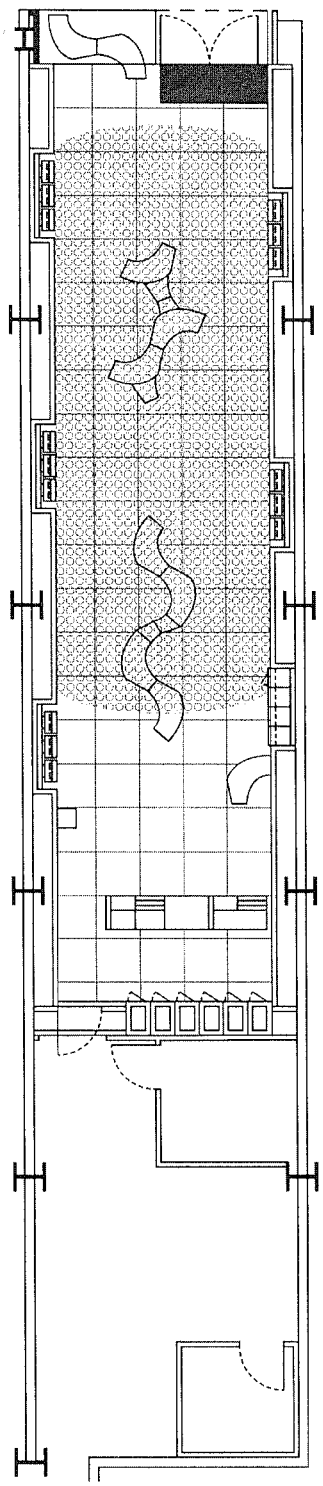
FIG. 16 shows an example of coverage markers on a floor plan resulting from the polynomial transform.
Figure 17:
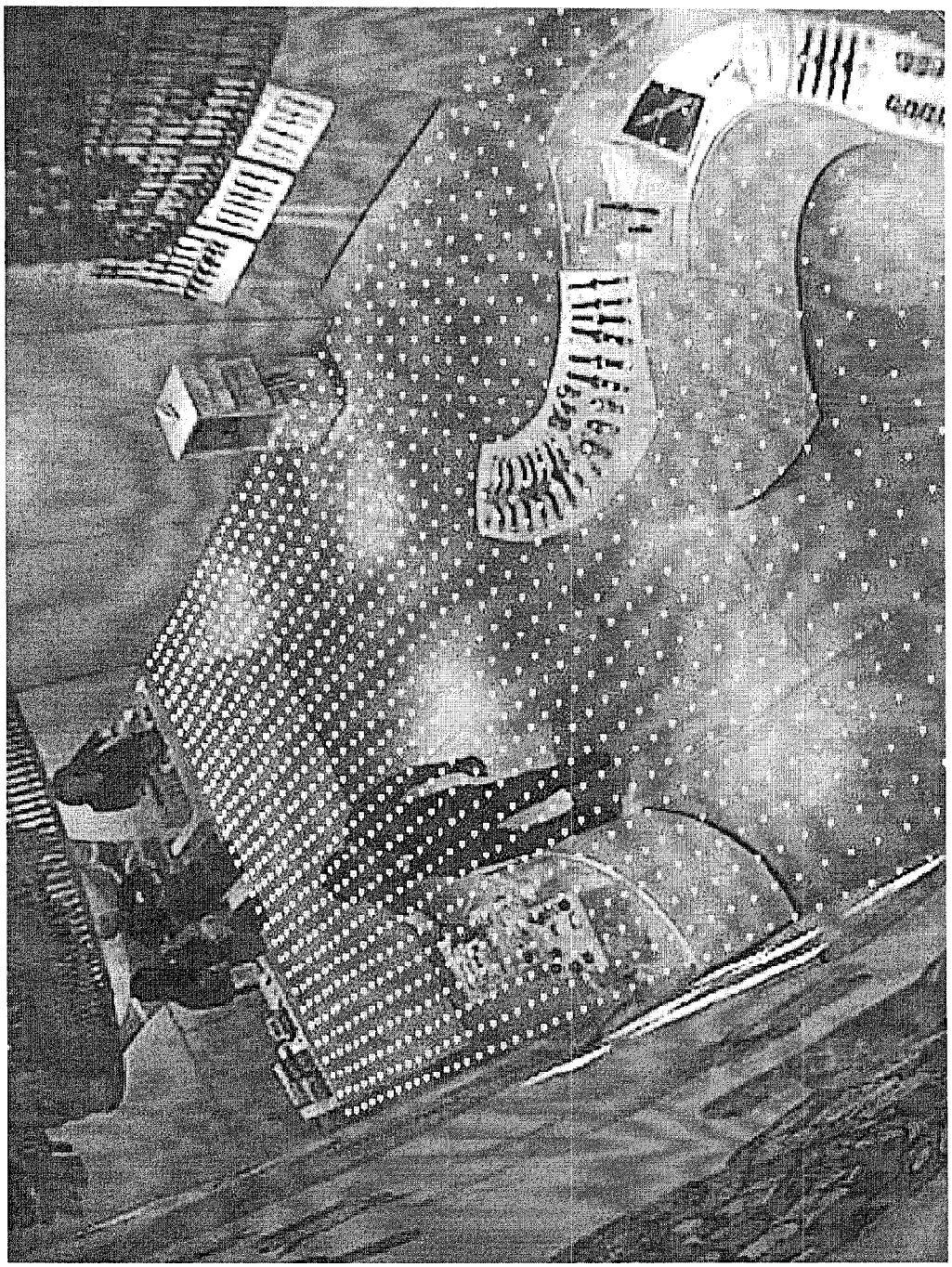
FIG. 17 shows an example of coverage markers on a camera image resulting from a projective transform.
Figure 18:
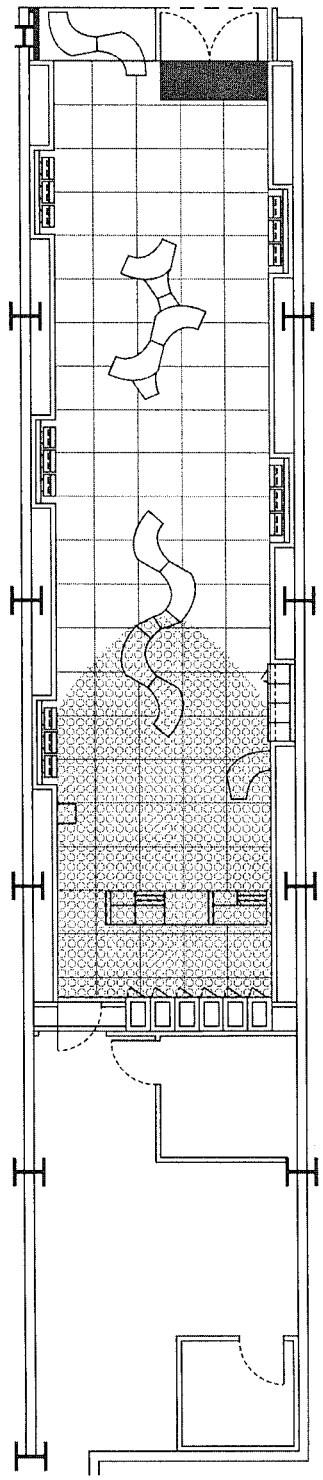
FIG. 18 shows an example of coverage markers on a floor plan resulting from the projective transform.

FIGS. 15 and 16 show a distribution result of using a polynomial transformation between the pairs of calibration points. FIGS. 17 and 18 show a distribution result of using a projective transformation between the pairs of calibration points. As discussed above, the transformation type can be based on the number of calibration points specified, input from the user after viewing the transformation results, type of camera lens, or combinations of these. A polynomial transformation may be used with a camera having a fisheye lens (see FIG. 15). A projective transformation may be used with a camera having a normal lens (see FIG. 17). In a specific implementation, the user indicates whether to use a polynomial or projective transformation type. In another specific implementation, the system automatically selects the transformation type to use.

Table A below shows the formula for a projective transform.

TABLE A

For a point p = [x, y] in camera-space we compute a point p' = [x', y'] in real-space via: p' = T$\bar{u}$ $$\text{Where } T = \begin{pmatrix} t_{1,1} & t_{1,2} \\ t_{2,1} & t_{2,2} \\ t_{3,1} & t_{3,2} \end{pmatrix}$$

And $\bar{u}$ = [x y 1]

Given a set of known corresponding $p_i \in P$ and $p_i' \in P'$, we perform a total least squares optimization to find T.

Table B below shows a formula for a polynomial transform.

TABLE B

For a point p = [x, y] in camera-space we compute a point p' = [x', y'] in real-space via: p' = T$\bar{u}$ TABLE B-continued $$\text{Where } T = \begin{pmatrix} t_{1,1} & t_{1,2} \\ t_{2,1} & t_{2,2} \\ t_{3,1} & t_{3,2} \\ t_{4,1} & t_{4,2} \\ t_{5,1} & t_{5,2} \\ t_{6,1} & t_{6,2} \\ t_{7,1} & t_{7,2} \\ t_{8,1} & t_{8,2} \\ t_{9,1} & t_{9,2} \\ t_{10,1} & t_{10,2} \end{pmatrix}$$

And $\bar{u}$ = [1 x y xy $x^2$ $y^2$ $yx^2$ $xy^2$ $x^3$ $y^3$]

Given a set of known corresponding $p_i \in P$ and $p_i' \in P'$, we perform a total least squares optimization via Singular Value Decomposition (SVD) to find T.

Referring now to FIG. 6, steps 620 and 625 describe a specific implementation of a flow where a user places a calibration or control point on the floor plan and, after placing the calibration point on the floor plan, places a corresponding calibration or control point on the image. In another specific implementation, the steps may be swapped. In this specific implementation, the user may place a calibration or control point on the image and, after placing the calibration point on the image, the user may place a corresponding calibration or control point on the floor plan. The system can accommodate users who prefer to place a point on the image first followed by placing the corresponding point on the floor plan—and users who prefer the opposite, i.e., placing a point on the floor plan first followed by placing the corresponding point on the image.

In another specific implementation, the user may place two or more calibration or control points on one of the image or floor plan, before placing the same number of calibration or control points on the other of the image or floor plan. For example, some users may prefer to not alternate between placing a calibration point on the floor plan and a corresponding calibration point on the image. In this specific implementation, the system allows the user to place two or more calibration points on, for example, the floor plan. After placing the two or more calibration points on the floor plan, the user may place a same number of corresponding calibration points on the image.

The system may highlight a calibration point to indicate that it is active so that the user can identify where a corresponding calibration point should be placed. For example, after the user places two or more calibration points on the floor plan, the system may highlight one of the two or more calibration points on the floor plan to indicate that the system is ready to detect on the image the calibration point that will correspond to the one highlighted calibration point on the floor plan.

The highlighting helps to inform the user that the next calibration point to be placed on the image will be identified by the system as the calibration point corresponding to the one highlighted calibration point. Thus, when the user places the calibration point on the image, the system will establish a correspondence between a reference location identified by the one highlighted calibration point and a corresponding reference location identified by the just placed calibration point. The highlighting may include flashing, blinking, animation, color, an arrow, or any other visual indication that allows a user to distinguish between a currently active calibration point and a currently inactive calibration point.

Referring now to FIG. 5, within the graphical user interface provided by the tool, a section may be referred to as a panel or region. These sections can be implemented as window panes that can be resized by the user (e.g., drag pane border to resize pane). Alternatively, the sections may be implemented as separate windows within the application window. For example, the windows may be floating windows that can be independently repositioned and resized within the application window (e.g., drag window via window title bar to reposition, or drag window corner to resize). This feature allows the user to reposition and resize the windows according to their preference.

As shown in the example of FIG. 5, the sections are arranged in a side-by-side layout. More particularly, in this example, the sections are arranged in a vertical side-by-side layout. The first section is above the second section. The second section is below the first section. There is a shared border 530 between the two sections. The first section is above the shared border. The second section is below the shared border. The side-by-side arrangement makes it easy for the user to identify a point on, for example, the floor plan, and a corresponding point on the image where both the point and corresponding point identify the same location. For example, the user can remain focused on the application window and not lose context because the application window can display both the floor plan of the space and the image or camera view of at least a portion of the space.

Figure 7:
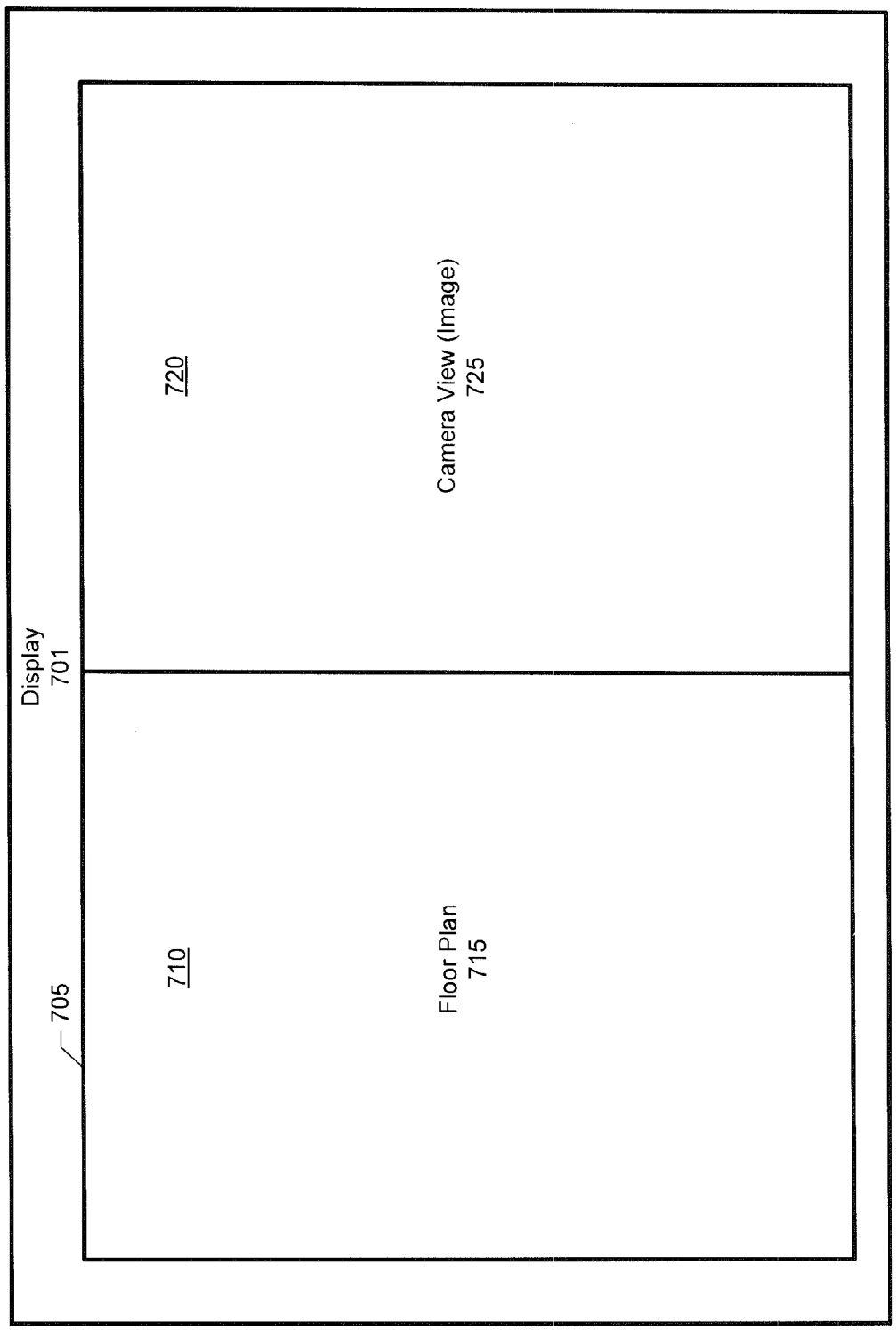
FIG. 7 shows a floor plan and image in a side-by-side horizontal layout.

FIG. 7 shows a computer screen 701 displaying an application window 705 having a first section 710 displaying a floor plan 715 of a space, and a second section 720 displaying an image 725 of at least a portion of the space as captured by a camera in the space. The information being displayed in application window 705 is similar to the information being displayed in application window 505 (FIG. 5). In application window 705, however, the layout or arrangement of the sections is a horizontal side-by-side layout. In other words, first section 710 is to the left or is on a left-hand side of second section 720. Second section 720 is to the right or is on a right-hand side of first section 710.

In a specific implementation, the system allows the user to choose whether they would like a horizontal side-by-side layout (FIG. 7) or a vertical side-by-side layout (FIG. 5). This is beneficial because different users may have different preferences on how they would like to see the information. The layout in FIG. 5 may be referred to as a portrait layout. The layout in FIG. 7 may be referred to as a landscape layout.

Figure 19A:
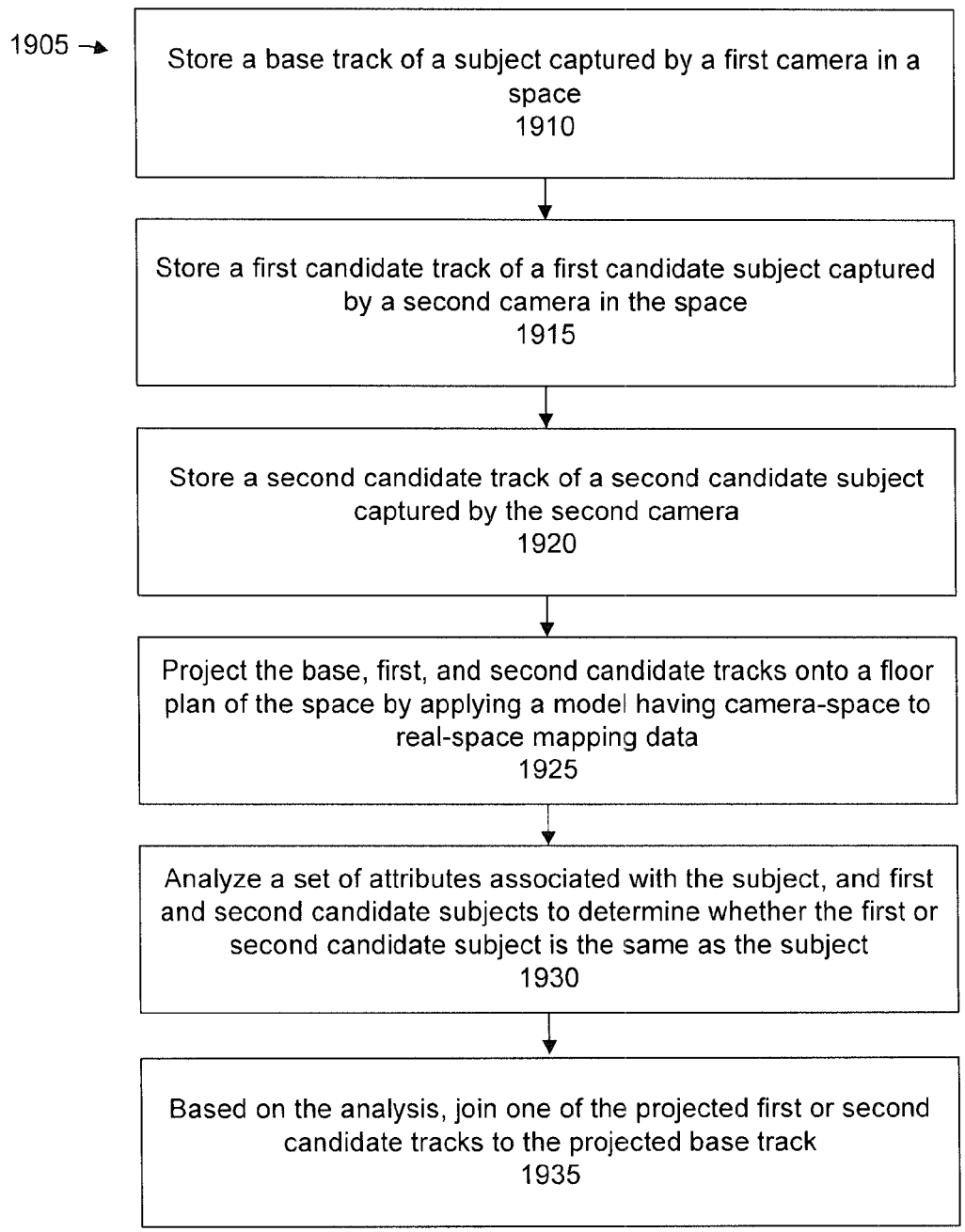
FIG. 19A shows an overall flow diagram for matching subject tracks.

FIG. 19A shows an overall flow 1905 for track matching. As discussed, in a specific implementation, within the view of each camera, subjects are tracked using various vision algorithms. The output of running these algorithms on a video stream are coordinates (in camera space) representing the locations of people in each frame of video. Additionally, the algorithms store shape (e.g., width and height), and color information for each tracked person.

In this specific implementation, with the projections derived above for each camera together with the output of person tracking from that camera, the system proceeds to project each individual track into real space. In doing so, the system places the location of the tracked subject onto the floor plan for each frame of video; the system uses a modified projection to project the subject's shape into real space (specified in centimeters, for example, rather than pixels).

In this specific implementation, matching then proceeds using a greedy algorithm as follows: for each base track, the system generates a score for all other available candidate tracks. This score describes the likelihood that the base track and the candidate track represent the same subject. The score takes into account temporal and spatial proximity (e.g., does one track end as the other begins?, are they nearby in real space?) as well as shape and color similarity (e.g., does the subject of each track have a similar appearance?).

The base track is joined to all candidate tracks whose score is above a user-specified threshold. These joined tracks are then compared to each other iteratively until no more joins are possible.

Referring now to FIG. 19A, in a specific implementation, in a step 1910, the system stores a base track of a subject captured by a first camera in a space. In a step 1915, the system stores a first candidate track of a first candidate subject captured by a second camera in the space. In a step 1920, the system stores a second candidate track of a second candidate subject captured by the second camera. The base, first, and second candidate tracks are defined in camera space (e.g., a pixel coordinate system). For example, each track may include a set of pixel coordinates (e.g, pixel coordinate X, pixel coordinate Y) which represents the subject's position within the camera view at a particular point in time.

Figure 20:
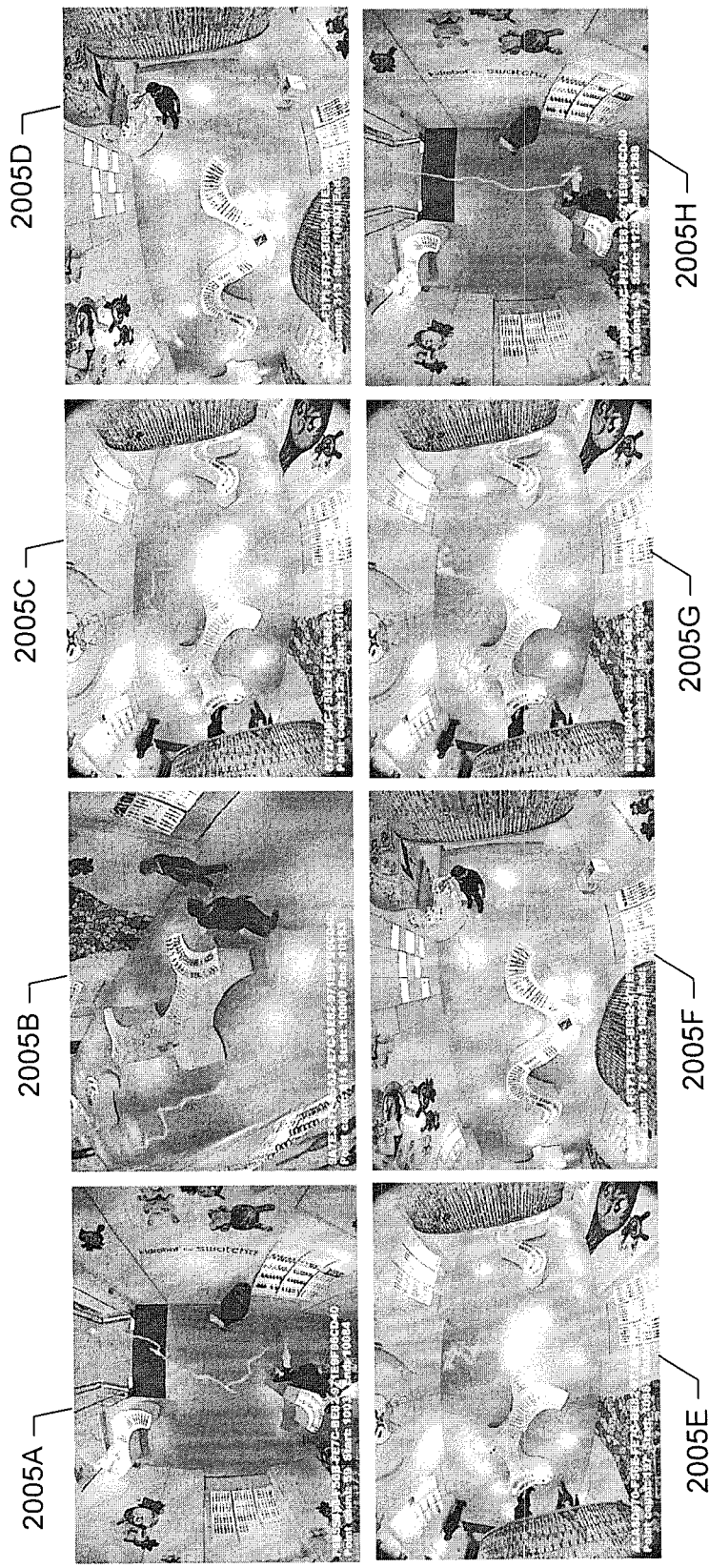
FIG. 20 shows a set of camera views or images.

FIG. 20 shows a set of images from the views of various cameras in a space. An image 2005A is from a first camera in the space. An image 2005B is from a second camera in the space. An image 2005C is from a third camera in the space. An image 2005D is from a fourth camera in the space. An image 2005E is from a fifth camera in the space. An image 2005F is from a sixth camera in the space. An image 2005G is from a seventh camera in the space. An image 2005F is from an eighth camera in the space. There is a track, superimposed over each image, which represents the movement of a subject within the view of a particular camera.

Figure 21:
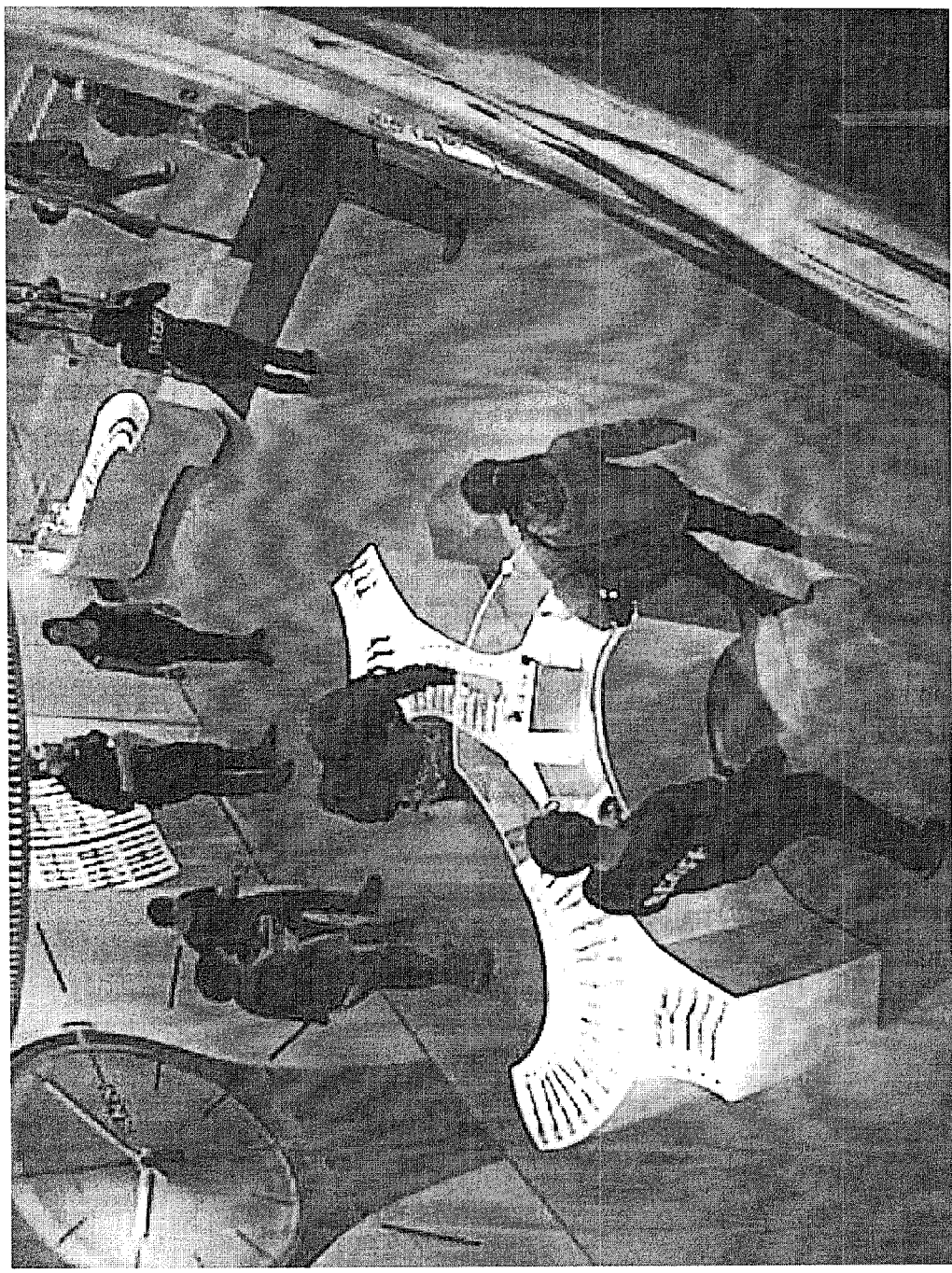
FIG. 21 shows an enlarged camera view or image.
Figure 22:
FIG. 22 shows another enlarged camera view or image.
Figure 23:
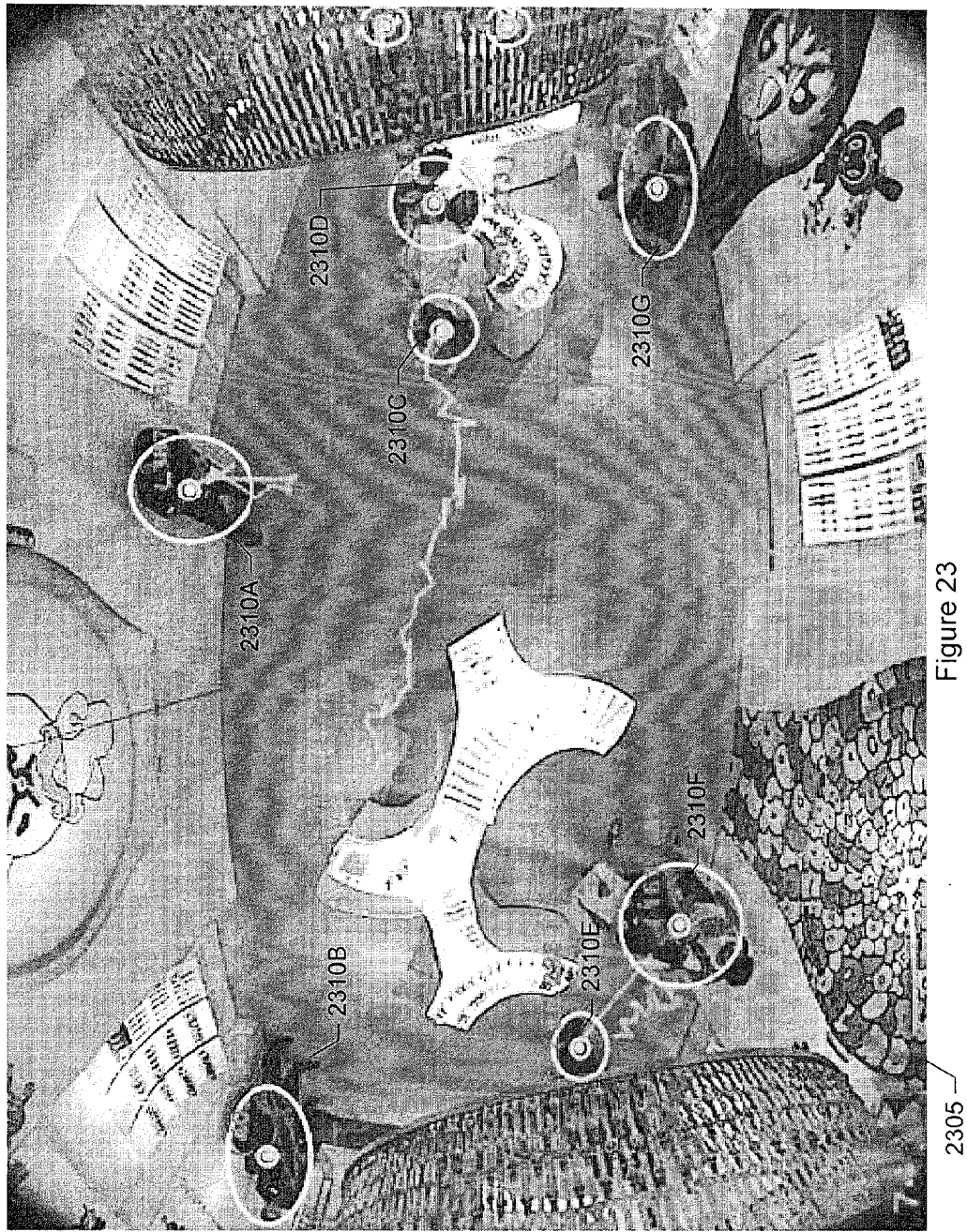
FIG. 23 shows an example of subjects being tracked within a view of a camera.

FIG. 21 shows an enlarged example of an image 2105 from a camera in the space. FIG. 22 shows an enlarged example of another image 2205 from another camera in the space. Each image includes a set of subjects (e.g., people). FIG. 23 shows an example of tracking subjects within a view of a camera. FIG. 23 shows an image 2305 from the camera where graphical tracking data has been superimposed over the image to identify the subjects and show their movement and position or location.

Image 2305 includes subjects 2310A-2310G that are being tracked by the system. A bounding box having a reference point or center point is drawn around each of the subjects. A size of the bounding box represents or is proportional to a size of the subject. A shape of the bounding box represents a shape of the subject. A bounding box may have the shape of circle, oval, ellipse, rectangle, square, or any other shape. A graphical tracking line or path is shown for each of the subjects and represents the subject's movements through the view of the camera. Depending upon the viewing options selected, the system may show a subject's coordinates. The coordinates may include pixel coordinates (e.g., coordinates x,y in camera-space), real coordinates (e.g., coordinates x',y' in real-space), or both.

Referring now to FIG. 19A, in a step 1925 the base, first, and second candidate tracks are projected onto a floor plan of the space. The floor plan is defined using a real-space, absolute, or ground plane coordinate system. In a specific implementation, the coordinate system includes Cartesian coordinates in real space. A Cartesian coordinate system specifies each point uniquely in a plane by a pair of numerical coordinates, which are the signed distances from the point to two fixed perpendicular directed lines, measured in the same unit of length.

A result of the projection is that the projected base, first, and second candidate tracks are defined using the real-space coordinate system. For example, each projected track may include a set of real-space coordinates x',y' which represents the subject's position on the floor plan at a particular point in time. In other words, the system places the location of the tracked subject onto the floor plan for each frame of video. A modified projection is used to project attributes such as the subject's shape into real-space.

Figure 24:
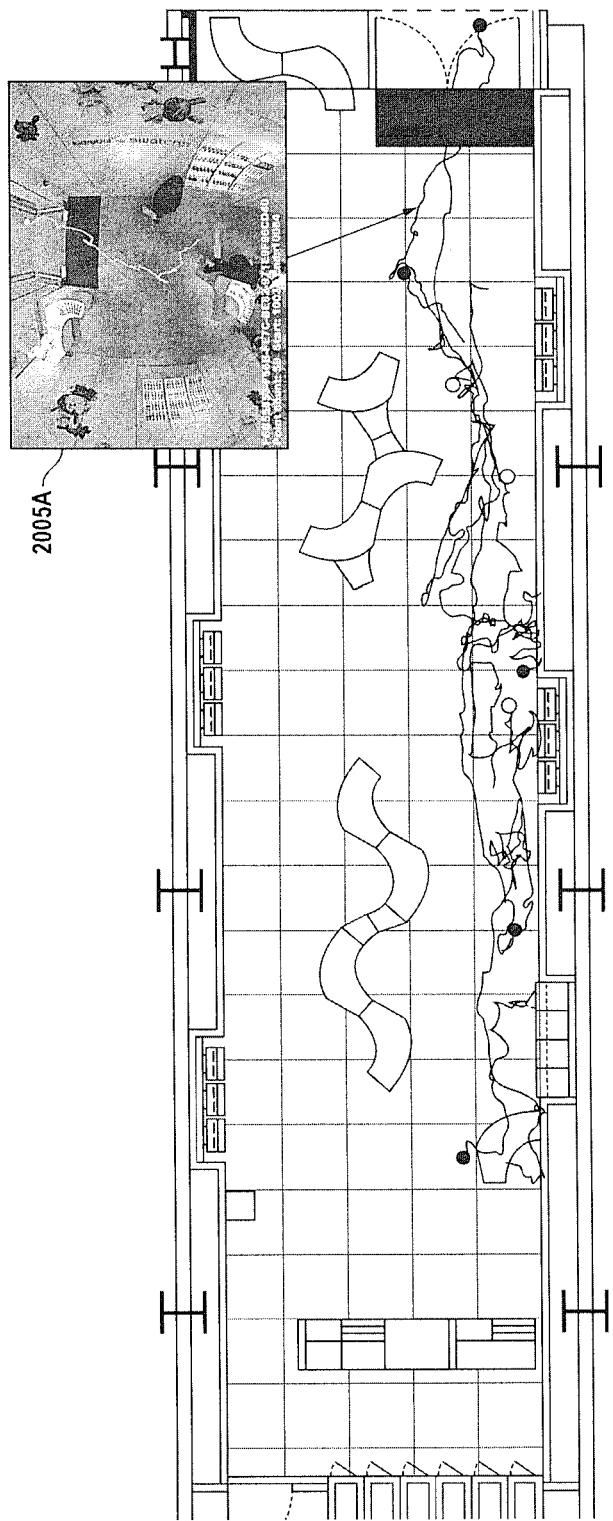
FIG. 24 shows unmatched or unjoined tracks on the floor plan.

FIG. 24 shows an example of tracks 2405 having been projected onto the floor plan. Each track represents the movement or tracking of a subject within a view of a particular camera in the space (e.g., camera view 2005A). The tracks may be shown using different colors, each color representing a particular camera in the space. Instead or additionally, the tracks may be shown using different patterns, each pattern representing a particular camera in the space (e.g., broken line pattern). In FIG. 24, the tracks are unjoined, unmatched, or not connected.

In a specific implementation, the unit of measurements for the real-space coordinate system is centimeters. In this specific implementation, a subject's position on the floor plan may be specified by a pair of coordinates (x',y'). For example, the coordinates (60, 100) may indicate the subject is 60 centimeters from an origin along the x'-axis and 100 centimeters from the origin along the y'-axis. The origin may be established at any arbitrary point on the floor plan (e.g., upper left hand corner, upper right hand corner, lower right hand corner, or lower left hand corner).

A subject's shape may be specified using width and height. For example, the shape measurements "170, 50" may indicate that the subject is 170 centimeters tall and 50 centimeters wide. A subject's size may be specified as an area measurement such as subject width multiplied by subject height (e.g., 50 centimeters*170 centimeters=8,500 square centimeters). A subject's velocity may include a first component indicating a speed of motion (e.g., 10 centimeters per second) and a second component indicating a direction of motion (e.g., east, west, north, or south). It should be appreciated that any unit of measurement may be used (e.g., millimeters, meters, inches, feet, degrees, radians, and so forth).

In a specific implementation, projecting the tracks includes applying or using a model that includes camera-space to real-space mapping or correspondence data. In a specific implementation, the model is the model of the space that was created using the graphical user interface tool (see FIGS. 3B and 6 and accompanying discussion). In other words, in this specific implementation, the mapping data is based on a set of calibration or control points identified on each view of each camera and a set of corresponding calibration or control points on identified on the floor plan, where each point and corresponding point is identified by a user using a graphical user interface tool.

Figure 19B:
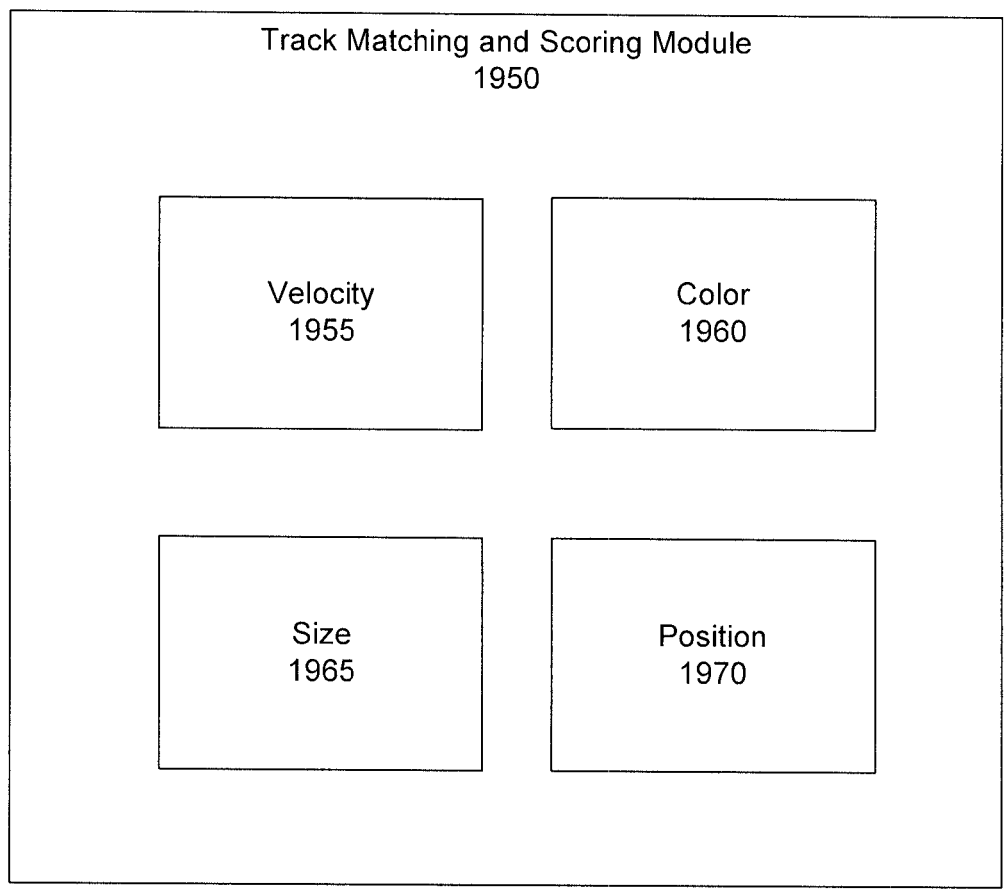
FIG. 19B shows subject attributes that may be used for track matching.

Referring now to FIG. 19A, in a step 1930, a set of attributes associated with the subject, and first and second candidate subjects is analyzed to determine whether the first or second candidate subject is the same as the subject. FIG. 19B shows a diagram illustrating the various subject attributes, parameters, characteristics, or properties that may be used by a track matching and scoring module 1950 of the system. As shown in the figure, track matching may be based on subject velocity 1955, color 1960, size 1965, position 1970, or combinations of these. Thus, in a specific implementation, a first attribute includes velocity, a second attribute includes color, a third attribute include size, and a fourth attribute includes position. In a step 1935, based on the analysis, the system joins one of the projected first or second candidate tracks to the projected base track.

In a specific implementation, matching a projected base track to projected candidate track uses a greedy algorithm as described above where the tracks are scored. In this specific implementation, given a single track as a starting point, we wish to find all tracks from other cameras that represent the same subject. Depending on the amount of camera overlap, we might expect to find a single track to join this track to, or many tracks to join to (for a given physical location, the number of tracks that will represent a subject corresponds to the number of cameras that can "see" that location). The goal is to find and connect all of these corresponding tracks.

Because this joining procedure can be inherently error prone (mainly due to errors in person tracking), an administrator can control the "aggressiveness" with which the system attempts to join tracks together. For example, the administrator can tell or otherwise indicate to the system to join any tracks that can POSSIBLY represent the same subject (resulting in more complete paths, but more errors) or to be more conservative, only joining tracks where it is CERTAINLY the same subject. This choice is generally a function of the specific use case for the tracked results.

For a candidate track, a score is generated to all potential matches that represents the likelihood that the two tracks represent the same subject. Table C below shows an example of the scoring algorithm used in this specific implementation.

TABLE C $\Theta(T_1, T_2) = 1 - (\alpha_V * \Delta V + \alpha_C * \Delta C + \alpha_S * \Delta S + \alpha_P * \Delta P)$
Where $T_1$ and $T_2$ are the tracks to be scored
$\Delta V$ is the difference in velocity between $T_1$ and $T_2$
$\Delta C$ is the difference in color between $T_1$ and $T_2$
$\Delta S$ is the difference in size between $T_1$ and $T_2$
$\Delta P$ is the difference in position between $T_1$ and $T_2$
And $\alpha$ are the weights applied to each $\Delta$ above.

Thus, in a specific implementation, scoring the projected base track and projected first candidate track includes calculating or measuring a first difference in velocity between the subject and first candidate subject and applying a first weight to the first difference, calculating a second difference in color between the subject and first candidate subject and applying a second weight to the second difference, calculating a third difference in size between the subject and first candidate subject and applying a third weight to the third difference, and calculating a fourth difference in position between the subject and first candidate subject and applying a fourth weight to the fourth difference.

Scoring the projected base track and projected second candidate track includes calculating a fifth difference in velocity between the subject and second candidate subject and applying the first weight to the fifth difference, calculating a sixth difference in color between the subject and second candidate subject and applying the second weight to the sixth difference, calculating a seventh difference in size between the subject and second candidate subject and applying the third weight to the seventh difference, and calculating an eighth difference in position between the subject and second candidate subject and applying the fourth weight to the eighth difference.

The weights applied to each of the attributes may be the same or different. The first weight may be the same as or different from the second, third, or fourth weight. The second weight may be the same as or different from the third or fourth weight. The third weight may be the same as or different from the fourth weight. This flexibility in weighting allows one attribute to be weighted more or less heavily than another attribute.

In a specific implementation, the scoring algorithm is biased or weighted towards subject color. Based on extensive experimentation, applicants have found that subject color can be a good factor in helping to determine whether the first or second candidate subject is the same as the subject. In this specific implementation, the second weight (i.e., weight to be applied to the difference in color) may be greater than the first, third, and fourth weights. However, this is not necessarily always the case. For example, in some applications the subjects to track may be wearing uniforms. So, color may be weighted less than other subject attributes such as velocity, size, shape, or position.

Velocity may include average speed, maximum speed, speed at a particular position or point in time (e.g., speed of subject upon leaving or exiting a first camera view, speed of subject upon entering a first camera view, speed of subject upon entering a second camera view while remaining within the first camera view, or speed of subject while in an overlapping camera views), direction (e.g., direction upon leaving or exiting a first camera view, direction upon entering a first camera view, direction upon entering a second camera view while remaining within a first camera view, or direction while within overlapping camera views), and so forth.

Color may include a color histogram of the subject. A color histogram is a representation of the distribution of colors associated with the subject. A color histogram can be used to represent the number of pixels that have colors in each of a fixed list of color ranges that span the image's color space. The color histogram may include the subject's skin color, hair color, clothing color, or combinations of these.

Position or spatial proximity may be include subject position upon entering a first camera view, the subject's position upon leaving the first camera view, the subject's position upon entering the second camera view while remaining within the first camera view, or combinations of these.

Figure 25:
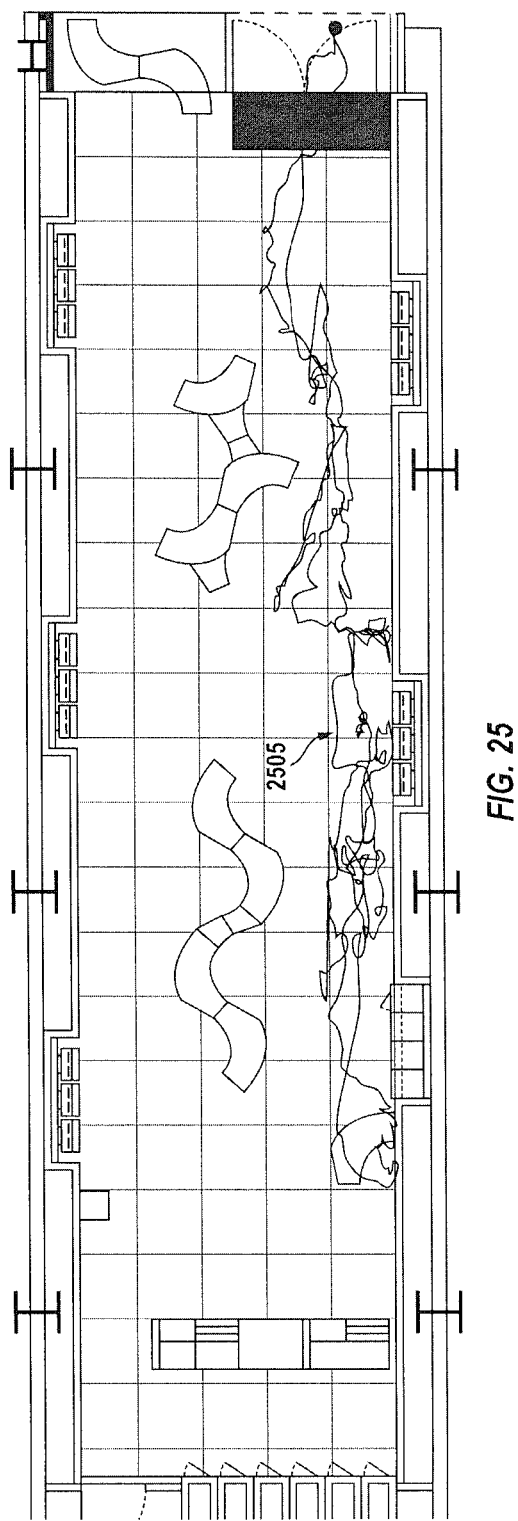
FIG. 25 shows a joined track on the floor plan.

FIG. 25 shows an example of a joined track 2505 that is displayed on the floor plan. The joined track represents the movement of subject through multiple camera views. For example, the joined track includes a first track of a subject within a first camera view, and a second track of a candidate subject within a second camera view, where based on the analysis (see step 1930, FIG. 19A and accompanying discussion), the subject and candidate subject were determined to be the same. The joined track may be referred to as a full path.

FIG. 26 shows a flow diagram 2605 for installing a system for tracking a subject across two or more cameras. In a step 2610, a user (e.g., installer) surveys a space to make a floor plan of the space. For example, the user may use a measuring tape, ruler, laser, or other measuring device to make measurements. Making the measurements of an existing space may include measuring a length of the space, measuring a width of the space, marking the location of structural and architectural elements, built-in elements, walls and partitions, display cases, racks, cash registers, doors, changing rooms, bathrooms, closets, columns, posts, poles, stairs, elevators, escalators, openings, features of the floor (e.g., floor mounted lighting, floor tile layout, floor mounted vents, floor mounted outlets or receptacles, carpet layout, floor penetrations, cracks, expansion joints, patterns, or floor drains)—just to name a few examples), and the like.

In a step 2615, the user installs a set of cameras in the space. The cameras may be mounted to a ceiling, wall, pole, or combinations of these. In a specific implementation, there are at least two cameras. However, this number can vary greatly. The number of cameras to install can depend on factors such as desired coverage, area of the space, or floor plan. For example, a large area such as a mall may require many more cameras than a small retail store in the mall.

Step 2615 is shown in broken lines to indicate that this step is optional and is not present in some implementations. In a specific implementation, the client, e.g., the retail store, does not have to install a new set of cameras in order to obtain the benefits of the system. In this specific implementation, the system can be used to retrofit or augment an existing security system having a set of existing cameras. Not having to purchase and install a new set of cameras helps to lower costs and reduces disruption. The system further allows for a new camera to be added to an existing set of cameras. The new camera may be different from the existing set of cameras. For example, the new and existing cameras may be from different manufacturers, may be different models, may have different lenses, and so forth.

In a step 2620, the user adjusts the cameras to have overlapping views. Adjusting a camera may include rotating the camera, tilting the camera, angling the camera, or relocating the camera. In a specific embodiment, there is a first camera having a first view that captures a first portion of a space. There is a second camera having a second view that captures a second portion of the space. One or both cameras are adjusted so that the first and second views are at least partially overlapping. When the views are at least partially overlapping, a third portion of the space is captured by both the first and second cameras.

In a step 2625, the user provides the floor plan to the system. For example, the user may use a computer-aided design (CAD) system to create the floor plan and upload the floor plan to the system.

In a step 2630, for each camera, the user uses a graphical user interface tool to place a set of calibration or control points in a camera view (e.g., camera image) and a set of corresponding calibration or control points on the floor plan to generate a model of the space (see FIG. 6 and accompanying discussion). As discussed above, the tool allows the user to place a calibration point on the image followed by a corresponding calibration point on the floor plan or vice-versa. Based on the input (i.e., user-specified point-to-point correspondences) the system generates a model and provides a visualization of the mapping capability of the model. In particular, after the placing of calibration points, the user views, reviews, evaluates, or assesses a distribution of a set of coverage markers shown on at least one of the first image or floor plan to determine an ability of the model to map a point in the first image to a point on the floor plan.

If the distribution indicates poor correspondence between the points and corresponding points (e.g., there is a twist in the coverage marker distribution, there are gaps in coverage, or the coverage markers are folding upon themselves—see FIG. 13), the user may use the tool to adjust, edit, or alter the points in order to generate a new model.

In a specific implementation, the method further includes after the reviewing a distribution, placing an additional first calibration point on one of the floor plan or first image to generate a new model. Placing an additional second calibration point on another of the floor plan or first image to generate the new model. And, after the placing an additional first and second calibration points, reviewing a new distribution of the plurality of coverage markers shown on at least one of the first image or floor plan to determine an ability of the new model to map the point in the first image to the point on the floor plan.

In another specific implementation, the method further includes after the reviewing a distribution, adjusting a position of a first calibration point of the set of first calibration points placed on one of the floor plan or first image to generate a new model, and after the adjusting a position, reviewing a new distribution of the set of coverage markers shown on at least one of the first image or floor plan to determine an ability of the new model to map the point in the first image to the point on the floor plan.

In a specific implementation, the space includes a second camera that provides a second image, and the method further includes placing a set of third calibration points on one of the floor plan or second image to generate the model, placing a set of fourth calibration points on another of the floor plan or second image to generate the model, where the set of fourth calibration points are to correspond to the set of third calibration points, and after the placing the set of third and fourth calibration points, reviewing another distribution of another set of coverage markers shown on at least one of the second image or floor plan to determine an ability of the model to map a second point in the second image to a second point on the floor plan.

As discussed above, a specific implementation of the system is person tracking in a retail environment. It should be appreciated, however, that aspects of the invention can be applied to tracking subjects in other environments such as airports, stadiums, buildings, arenas, outdoor environments (e.g., cities and towns), factories, manufacturing plants, parks, zoos, and so forth. In other specific embodiments, the subjects may instead or additionally include non-humans, such as animals, fish, and so forth.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
    identifying a base track of a tracked subject, the base track being identified as a first track in a first camera space based on images of the tracked subject captured by a first camera in a space, the first track being a first superimposed line in the first camera space that represents locations occupied by the tracked subject in the first camera space over a fixed period of time;
    identifying a first candidate track of a first candidate subject from a plurality of candidate tracks captured by a second camera, the first candidate track being identified as a second track in a second camera space based on images of the first candidate subject captured by the second camera in the space, the second track being a second superimposed line in the second camera space that represents locations occupied by the first candidate subject in the second camera space over the fixed period of time;
    identifying a second candidate track of a second candidate subject from the plurality of candidate tracks captured by the second camera, the second candidate track being identified as a third track in a second camera space based on images of the second candidate subject captured by the second camera in the space, the third track being a third superimposed line in the second camera space that represents locations occupied by the second candidate subject in the second camera space over the fixed period of time;
    generating a model comprising camera-space data to real-space data correspondence that is independent of camera lens type, the camera-space data having coordinates measured in pixels and the real-space data having coordinates measured in lengths, the model being generated by mapping a set of calibration points identified in each camera-space of each camera and a set of corresponding calibration points identified in a floor plan representing the real-space;
    applying the model comprising the camera-space to real-space correspondence mapping data to project the base track, the first candidate track, and the second candidate track onto a the floor plan of the space;
    comparing a first set of attributes associated with the tracked subject, a second set of attributes associated with the first candidate subject and a third set of attributes associated with the second candidate subject, the comparing comprising:
        scoring the projected base track and projected first candidate track by calculating a first plurality of differences between the first set of attributes and the second set of attributes and applying weights to the plurality of differences such that a color attribute difference is weighted more than the other attributes to determine a score for the projected first candidate track; and
        scoring the projected base track and projected second candidate track by calculating a second plurality of differences between the first set of attributes and the third set of attributes and applying the same weights as applied to the first plurality of differences to determine a score for the projected second candidate track;
    determining, based upon the comparison, that the first candidate subject is the same as the tracked subject when the score for the projected first candidate track is greater than a user-specified threshold; and
    joining, based upon the determination that the first candidate subject is the same as the tracked subject, the projected first candidate track to the projected base track to create a continuous track of the tracked subject on the floor plan of the space.

2. The method of claim 1 wherein the mapping data is based on a plurality calibration points placed on each view of each camera and a plurality of corresponding calibration points on placed on the floor plan, and each calibration point and corresponding calibration point is placed by a user using a graphical user interface tool.

3. The method of claim 1 wherein the base, first candidate, and second candidate tracks are defined in a camera-space coordinate system and after the applying the model, the projected base, and first candidate, and second candidate tracks are defined in a real-space coordinate system.

4. The method of claim 1 wherein a first attribute of each of the first, second and third sets of attributes comprises color and the analyzing a set of attributes comprises:
  measuring a difference between a color of the tracked subject and a color of the first candidate subject; and
  measuring a difference between the color of the tracked subject and a color of the second candidate subject.

5. The method of claim 1 wherein a first attribute of each of the first, second and third sets of attributes comprises size and the analyzing a set of attributes comprises:
  measuring a difference between a size of the tracked subject and a size of the first candidate subject; and
  measuring a difference between the size of the tracked subject and a size of the second candidate subject.

6. The method of claim 1 wherein the size comprises a height and a width.

7. The method of claim 1 wherein a first attribute of each of the first, second and third sets of attributes comprises position and the analyzing a set of attributes comprises:
  measuring a difference between a position of the projected base track and a position of the projected first candidate track; and
  measuring a difference between the position of the projected base track and the position of the projected second candidate track.

8. The method of claim 1 wherein a first attribute of each of the first, second and third sets of attributes comprises velocity and the analyzing a set of attributes comprises:
  measuring a difference between a velocity of the projected base track and a velocity of the projected first candidate track; and
  measuring a difference between the velocity of the projected base track and a velocity of the projected second candidate track.

9. The method of claim 1 wherein the analyzing a set of attributes comprises:
  scoring the projected base track and projected first candidate track by:
    calculating a first difference in velocity between the tracked subject and first candidate subject and applying a first weight to the first difference;
    calculating a second difference in color between the tracked subject and first candidate subject and applying a second weight to the second difference;
    calculating a third difference in size between the tracked subject and first candidate subject and applying a third weight to the third difference; and
    calculating a fourth difference in position between the tracked subject and first candidate subject and applying a fourth weight to the fourth difference; and
  scoring the projected base track and projected second candidate track by:
    calculating a fifth difference in velocity between the tracked subject and second candidate subject and applying the first weight to the fifth difference;
    calculating a sixth difference in color between the tracked subject and second candidate subject and applying the second weight to the sixth difference;
    calculating a seventh difference in size between the tracked subject and second candidate subject and applying the third weight to the seventh difference; and
    calculating an eighth difference in position between the tracked subject and second candidate subject and applying the fourth weight to the eighth difference.

* * * * *